US012664025B2

(12) United States Patent
Xiao et al.

(10) Patent No.: US 12,664,025 B2
(45) Date of Patent: *Jun. 23, 2026

(54) SYSTEM AND METHOD FOR THROTTLING SERVICE REQUESTS HAVING NON-UNIFORM WORKLOADS

(71) Applicant: Amazon Technologies, Inc., Seattle, WA (US)

(72) Inventors: Wei Xiao, Kirkland, WA (US); David Alan Lutz, Renton, WA (US); Timothy Andrew Rath, Des Moines, WA (US); Maximiliano Maccanti, Bellevue, WA (US); Miguel Mascarenhas Filipe, Seattle, WA (US); David Craig Yanacek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,379

(22) Filed: Mar. 3, 2023

(65) Prior Publication Data

US 2023/0283681 A1 Sep. 7, 2023

Related U.S. Application Data

(63) Continuation of application No. 17/245,811, filed on Apr. 30, 2021, now Pat. No. 11,601,512, which is a
(Continued)

(51) Int. Cl.
*G06F 9/50* (2006.01)
*G06F 11/34* (2006.01)
(Continued)

(52) U.S. Cl.
CPC .......... *G06F 9/505* (2013.01); *G06F 11/3433* (2013.01); *G06F 11/3452* (2013.01);
(Continued)

(58) Field of Classification Search
CPC ................. G06F 9/505; G06F 11/3433; G06F 2209/504; G06F 2201/81; H04L 41/0896; H04L 47/76
See application file for complete search history.

(56) References Cited

U.S. PATENT DOCUMENTS 5,367,523 A 11/1994 Chang et al.
5,596,576 A 1/1997 Milito
(Continued)

FOREIGN PATENT DOCUMENTS

EP 2622801 A1 * 8/2013 ........... H04L 47/823

OTHER PUBLICATIONS

U.S. Appl. No. 13/327,616, filed Dec. 15, 2012, Wei Xiao, et al.
(Continued)

*Primary Examiner* — Shirley X Zhang
(74) *Attorney, Agent, or Firm* — S. Scott Foster; Kowert, Hood, Munyon, Rankin & Goetzel, P.C

(57) ABSTRACT

A system that provides services to clients may receive and service requests, various ones of which may require different amounts of work. The system may determine whether it is operating in an overloaded or underloaded state based on a current work throughput rate, a target work throughput rate, a maximum request rate, or an actual request rate, and may dynamically adjust the maximum request rate in response. For example, if the maximum request rate is being exceeded, the maximum request rate may be raised or lowered, dependent on the current work throughput rate. If the target or committed work throughput rate is being exceeded, but the maximum request rate is not being exceeded, a lower maximum request rate may be proposed. Adjustments to the maximum request rate may be made using multiple incremental adjustments. Service request tokens may be added to a leaky token bucket at the maximum request rate.

20 Claims, 13 Drawing Sheets

Related U.S. Application Data continuation of application No. 16/377,078, filed on Apr. 5, 2019, now Pat. No. 10,999,381, which is a continuation of application No. 14/570,900, filed on Dec. 15, 2014, now Pat. No. 10,257,288, which is a continuation of application No. 13/327,620, filed on Dec. 15, 2011, now Pat. No. 8,914,497.

(51) Int. Cl.
| | |
|---|---|
| *H04L 41/0896* | (2022.01) |
| *H04L 47/76* | (2022.01) |
| *H04L 47/78* | (2022.01) |
| *H04L 67/51* | (2022.01) |

(52) U.S. Cl.
CPC ...... *G06F 11/3485* (2013.01); *H04L 41/0896* (2013.01); *H04L 47/76* (2013.01); *H04L 47/78* (2013.01); *H04L 67/51* (2022.05); *G06F 2209/504* (2013.01); *Y02D 10/00* (2018.01)

(56) References Cited

U.S. PATENT DOCUMENTS

| | | | |
|---|---|---|---|
| 6,424,624 B1 | 7/2002 | Galand et al. | |
| 6,789,203 B1 * | 9/2004 | Belissent | H04L 63/1416 |
| | | | 726/22 |
| 6,801,501 B1 | 10/2004 | Knightly et al. | |
| 6,889,050 B1 * | 5/2005 | Willars | H04W 8/04 |
| | | | 455/452.2 |
| 6,925,055 B1 * | 8/2005 | Erimli | H04L 47/2458 |
| | | | 370/230.1 |
| 6,965,730 B2 | 11/2005 | Chamberlin et al. | |
| 7,006,437 B2 | 2/2006 | Ogier et al. | |
| 7,228,354 B2 | 6/2007 | Chambliss et al. | |
| 7,388,838 B2 | 6/2008 | Abraham et al. | |
| 7,685,109 B1 | 3/2010 | Ransil et al. | |
| 7,688,731 B2 | 3/2010 | Haumont et al. | |
| 7,764,615 B2 | 7/2010 | Gilfix | |
| 7,911,958 B2 | 3/2011 | Baden et al. | |
| 8,099,102 B2 | 1/2012 | Ishii et al. | |
| 8,233,448 B2 | 7/2012 | Satapathy et al. | |
| 8,250,197 B2 | 8/2012 | Gulati et al. | |
| 8,255,915 B1 | 8/2012 | Blanding et al. | |
| 8,483,194 B1 | 7/2013 | Wu et al. | |
| 8,667,056 B1 | 3/2014 | Proulx et al. | |
| 8,914,497 B1 | 12/2014 | Xiao et al. | |
| 9,258,233 B2 | 2/2016 | Neeser | |
| 9,319,325 B2 | 4/2016 | Mohandoss et al. | |
| 10,257,288 B2 | 4/2019 | Xiao et al. | |
| 11,086,898 B2 | 8/2021 | Muniswamy-Reddy et al. | |
| 11,601,512 B2 | 3/2023 | Xiao et al. | |
| 2002/0059408 A1 | 5/2002 | Pattabhiraman et al. | |
| 2002/0124103 A1 * | 9/2002 | Maruyama | H04L 47/10 |
| | | | 709/228 |
| 2002/0188717 A1 | 12/2002 | Mushlin et al. | |
| 2005/0083845 A1 | 4/2005 | Compton et al. | |
| 2005/0240745 A1 | 10/2005 | Iyer et al. | |
| 2007/0076613 A1 * | 4/2007 | Malhotra | H04L 43/00 |
| | | | 370/465 |
| 2007/0112723 A1 | 5/2007 | Alvarez et al. | |
| 2007/0226332 A1 | 9/2007 | Becker-Szendy et al. | |
| 2008/0008094 A1 | 1/2008 | Gilfix | |
| 2008/0031132 A1 | 2/2008 | Compton et al. | |
| 2009/0003204 A1 | 1/2009 | Okholm et al. | |
| 2009/0006920 A1 * | 1/2009 | Munson | H04L 1/1848 |
| | | | 714/748 |
| 2009/0300040 A1 | 12/2009 | Kaijima et al. | |
| 2010/0131668 A1 * | 5/2010 | Kamath | H04L 47/32 |
| | | | 709/233 |
| 2010/0169486 A1 * | 7/2010 | McCormack | H04L 67/1012 |
| | | | 709/226 |
| 2010/0192156 A1 | 7/2010 | Hollingsworth | |
| 2010/0271947 A1 | 10/2010 | Abdelal et al. | |
| 2011/0010427 A1 | 1/2011 | Jnagal et al. | |
| 2011/0083179 A1 | 4/2011 | Lawson et al. | |
| 2011/0099147 A1 | 4/2011 | McAlister et al. | |
| 2011/0238857 A1 | 9/2011 | Certain et al. | |
| 2011/0320631 A1 | 12/2011 | Finkelstein | |
| 2012/0066554 A1 | 3/2012 | Ruiz | |
| 2012/0072588 A1 | 3/2012 | Kamath et al. | |
| 2012/0101991 A1 | 4/2012 | Srivas et al. | |
| 2012/0254444 A1 | 10/2012 | Harchol-Balter et al. | |
| 2012/0317069 A1 | 12/2012 | Oono | |
| 2012/0330954 A1 | 12/2012 | Sivasubramanian et al. | |
| 2013/0080627 A1 | 3/2013 | Kukreja et al. | |
| 2013/0132057 A1 * | 5/2013 | Deng | G06F 11/3433 |
| | | | 703/21 |
| 2015/0085660 A1 | 3/2015 | Harris et al. | |

OTHER PUBLICATIONS

"Windows Azure Table", Jai Haridas, et al., May 2009, pp. 1-42.
"Windows Azure Storage—Essential Cloud Storage Services", Professional Developers Conference, 2008, Brad Calder, pp. 1-64.
Dynamo: Amazon's Highly Available Key-value Store, G. DeCandia, D. Hastorun, M. Jampani, G. Kakulapati, A. Lakshman, S. Sivasubramanian, P. Vosshall, and W. Vogels, in SOSP '07, pp. 205-220.

* cited by examiner

SYSTEM AND METHOD FOR THROTTLING SERVICE REQUESTS HAVING NON-UNIFORM WORKLOADS

This application is a continuation of U.S. patent application Ser. No. 17/245,811, filed Apr. 30, 2021, which is a continuation of U.S. patent application Ser. No. 16/377,078, filed Apr. 5, 2019, now U.S. Pat. No. 10,999,381, which is a continuation of U.S. patent application Ser. No. 14/570, 900, filed Dec. 15, 2014, now U.S. Pat. No. 10,257,288, which is a continuation of U.S. patent application Ser. No. 13/327,620, filed Dec. 15, 2011, now U.S. Pat. No. 8,914, 497, which are hereby incorporated by reference in their entirety.

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Every system that provides services to clients needs to protect itself from a crushing load of service requests that could potentially overload the system. In general, for a Web service or remote procedure call (RPC) service, a system is considered to be in an "overloaded" state if it is not able to provide the expected quality of service for some portion of client requests it receives. Common solutions applied by overloaded systems include denying service to clients or throttling a certain number of incoming requests until the systems get out of an overloaded state.

Many current systems avoid an overload scenario by comparing the request rate with a fixed or varying global threshold and selectively refusing service to clients once this threshold has been crossed. However this approach does not take into account differences in the amount of work that could be performed in response to accepting different types and/or instances of services requests for servicing. In addition, it is difficult, if not impossible, to define a single global threshold that is meaningful (much less that provides acceptable performance) in a system that receives different types of requests at varying, unpredictable rates, and for which the amount of work required to satisfy the requests is also varying and unpredictable.

Figure 1:
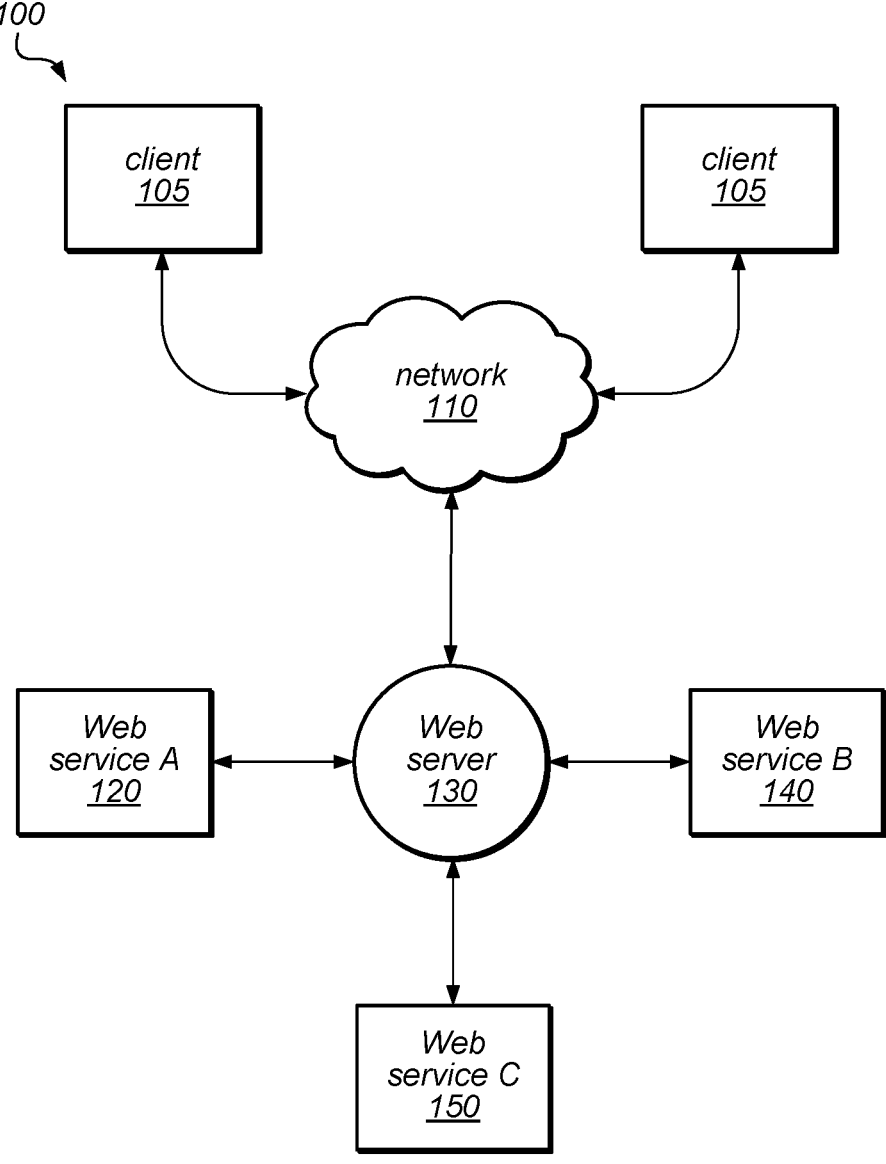
FIG. 1 is a block diagram illustrating components of a system that provides various Web-based services to clients, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

A computing system that provides services to clients may receive and service various types of requests, and different amounts of work may be required to be performed in order to satisfy different ones of these requests. As described in more detail herein, the system may be configured to determine whether it is operating in an overloaded or under-loaded state based on a current work throughput rate (e.g., a number of units of work performed per second in satisfying one or more recent service requests), a target work throughput rate (which may be a committed work throughput rate that is guaranteed by the system), a maximum request rate (i.e. the maximum rate at which service requests are to be accepted for servicing), and/or an actual request rate (i.e. the rate at which service requests are received).

In some embodiments, the system may be configured to dynamically adjust the maximum request rate in response to detecting that it is an overloaded or under-loaded state, and/or in response to a changing workload (e.g., a changing work throughput rate). For example, if the maximum request rate is being exceeded, it may be raised or lowered, dependent on the current work throughput rate. If the target (or committed) work throughput rate is being exceeded, but the maximum request rate is not being exceeded, a lower maximum request rate may be proposed that is not dependent on the current maximum request rate. In some embodiments, adjustments to the maximum request rate may be made using multiple incremental adjustments.

In some embodiments, adherence to the maximum request rate may be controlled using an admission controller based on a "leaky bucket" type mechanism. In such embodiments, service request tokens may be added to a leaky token bucket at a rate equal to the maximum request rate, and may be consumed by service requests that are accepted for servicing. In some embodiments, if at least one service request token is present in the bucket when a service request is received, it may be serviced. In other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors). In some embodiments, the minimum number of tokens that must be present in the token bucket in order for a received service request to be accepted for servicing may be zero or a negative number. For example, the system may be configured to continue to accept at least some requests for servicing when the token bucket has been depleted (in effect "borrowing" one or more tokens that are expected to be added to the bucket prior to their addition) until the bucket contains fewer than the minimum number of tokens (which may be zero or a negative number).

In some embodiments, a computing system that provides services to clients may be configured to manage service requests using work-based tokens, each of which represents a fixed amount of work (e.g., a work unit) rather than a service request. In such embodiments, the work-based tokens may be added to a token bucket at rate that is dependent on a target work throughput rate as long as the number of tokens in the bucket does not exceed its maximum capacity. In some embodiments, if at least one token is present in the bucket when a service request is received, it may be serviced. In other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service. Here again, the minimum number of tokens that must be present in the token bucket in order for a received service request to be accepted for servicing may in some embodiments be zero or a negative number, and the system may be configured to continue to accept at least some requests for servicing when the token bucket has been depleted until the bucket contains fewer than the minimum number of tokens (which may be zero or a negative number). Servicing the request may include deducting an initial number of work-based tokens from the bucket, determining that the amount of work performed in servicing the request was more than that represented by the initially deducted work-based tokens, and deducting additional tokens from the bucket to make up the difference (i.e. to reflect the actual amount of work performed in servicing the request).

In some embodiments, a computing system that provides services to clients may support two or more admission control mechanisms, including one or more mechanisms based on tokens that represent serviced requests and one or more mechanisms that use work-based tokens. In such embodiments, an initial admission control mechanism may be selected for managing service requests and/or the admission control mechanism may be dynamically changed during operation of the system in dependent on or in response to current and/or changing conditions in the system itself and/or the workload behavior experienced in the system.

The techniques described herein may be applied in various systems in which the amount of work needed to satisfy various service requests is not uniform or fixed, and/or in which the work performed when servicing requests may be a limiting factor in the operation and/or performance of the system (e.g., due to technical capabilities, capacity, or bandwidth, or due to business and/or policy considerations, including various service level agreements). For example, they may be applied in a system that provides data storage services to clients, and in which satisfying requests to read and/or write data maintained by the data storage system requires varying numbers of input/output (I/O) operations, depending on the type of request and the number of data transfers required to return the results.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 1 illustrates a block diagram of a system that provides various Web-based services to clients, according to one embodiment. In this example, system 100 includes one or more clients 105. In this example, the clients 105 may be configured to interact with a Web server 130 via a communication network 110.

Figure 2:
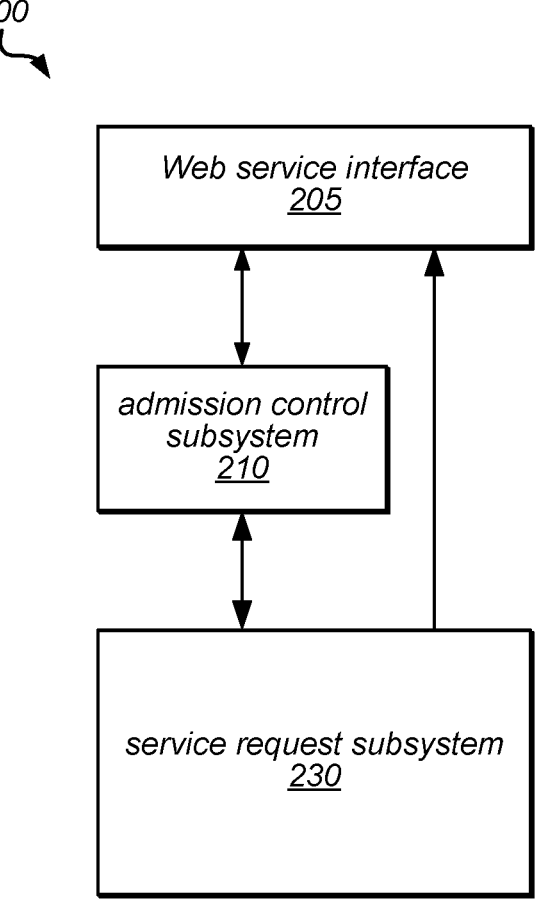
FIG. 2 is a block diagram illustrating subsystems of a system that provides various Web-based services to clients, according to one embodiment.

As illustrated in this example, the Web server 130 may be configured to process requests from clients 105 for various services, such as Web service A (120), Web service B (140), and Web service C (150), and to return results to the clients 105. Each of the web services may provide clients with one or more of: computational resources, database services, data storage services (e.g., maintaining data in one or more tables on behalf of a client), or any other types of services or shared resources. As described in more detail herein, in various embodiments, a component of Web server 130 may be configured to determine whether a computing system, such as computing system 200 in FIG. 2, is operating in an overloaded state with respect to a maximum request rate and/or a target work throughput rate. For example, in some embodiments, an admission control subsystem, such as admission control subsystem 210 in FIG. 2, may be configured to monitor the performance of computing system 200 with respect to the servicing of client requests, and may be configured to throttle and otherwise manage service requests that have non-uniform workloads (e.g., adjusting a maximum request rate dependent on a current work throughput rate, or throttling requests dependent on work-based tokens) in order to maintain an acceptable level of availability and/or responsiveness in the system. Computing system 200 and admission control subsystem 210 in FIG. 2 are described in more detail below.

In the example illustrated in FIG. 1, the clients 105 may encompass any type of clients configured to submit service requests to Web server 130 via network 110 on behalf of a user or a requesting application. For example, a given client 105 may include a suitable version of a Web browser, or a plug-in module or other type of code module configured to execute as an extension to or within an execution environment provided by a Web browser. Alternatively, a client 105 may encompass an application such as a database application, media application, office application, or any other application that may make use of the services provided by Web server 130. In some embodiments, such an application may include sufficient protocol support (e.g., for a suitable version of Hypertext Transfer Protocol (HTTP)) for generating and processing Web service requests without necessarily implementing full browser support for all types of Web-based data. That is, client 105 may be an application configured to interact directly with Web server 130. In various embodiments, client 105 may be configured to generate requests for Web services according to a Representational State Transfer (REST)-style Web services architecture, a document or message-based Web services architecture, or another suitable Web services architecture. In some embodiments, client 105 may be configured to provide access to Web-based service to other applications in a manner that is transparent to those applications. For example, a client 105 may be configured to integrate with an operating system to provide services in accordance with a suitable variant of the service model described herein. However, the operating system may present a different service request interface to applications than that described herein.

In various embodiments, the communication network 110 may encompass any suitable combination of networking hardware and protocols necessary to establish Web-based communications between clients 105 and Web server 130. For example, the communication network 110 may generally encompass the various telecommunications networks and service providers that collectively implement the Internet. The communication network 110 may also include private networks such as local area networks (LANs) or wide area networks (WANs) as well as public or private wireless networks. For example, both a given client 105 and the Web server 130 may be respectively provisioned within enterprises having their own internal networks. In such an embodiment, the communication network 110 may include the hardware (e.g., modems, routers, switches, load balancers, proxy servers, etc.) and software (e.g., protocol stacks, accounting software, firewall/security software, etc.) necessary to establish a networking link between the given client 105 and the Internet as well as between the Internet and Web server 130. Note that in some embodiments, clients 105 may communicate with Web server 130 using a private network rather than the public Internet. For example, in some embodiments clients 105 may be provisioned within the same enterprise as the resources that provide various services to those clients. In such a case, clients 105 may communicate with a server 130 entirely through a private communication network (not shown).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

In some embodiments in which the system provides data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

FIG. 2 is a block diagram illustrating a computing system 200 that provides various Web-based services to clients, according to some embodiments. For example, in some embodiments, computing system 200 may implement a Web server, such as Web server 130 illustrated in FIG. 1. In various embodiments, computer system 200 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 200 in order to provide services requested by various clients. In some embodiments, the amount of work required to satisfy service requests within a given system may be non-uniform. In such embodiments, the number and/or type of resources allocated and/or consumed when servicing each request may be dependent on the number of work units required to satisfy the request. For example, in order to satisfy a service request directed to a data storage system, the data storage system may allocate one or more database connections, input/output channels, storage resource portions and/or other resources for each normalized, logical work unit or logical service request unit required to satisfy the request. As illustrated in this example, computing system 200 may include a Web service interface 205, an admission control subsystem 210, and a service request subsystem 230.

In this example, Web services interface 205 may be configured to receive requests for services from various clients and to communicate with admission control subsystem 210 to facilitate the performance of those services on behalf of the clients. For example, in some embodiments, admission control subsystem 210 may be configured to determine which and/or how many service requests to accept from various clients, and may communicate with a service request subsystem 230 to accept and/or service one or more received service requests. In some embodiments, admission control subsystem 210 may be configured to determine which and/or how many service requests to accept dependent on a maximum request rate for the system and/or for a particular client, application, target, request type, or operation. As described herein, the maximum request rate may be dynamically adjusted dependent on the current work throughput rate and/or a target or committed work throughput rate. In other embodiments, service requests may be managed using work-based tokens, as described herein. In various embodiments, admission control subsystem 210 may implement one or more admission control mechanisms, including any or all of those described herein or any other admission control mechanism suitable for managing service requests that have non-uniform workloads.

In some embodiments, if a service request is accepted for servicing by admission control subsystem 210, service request subsystem 230 may in turn be configured to allocate (or initiate allocation of) one or more resources needed to perform the requested services to those requests, and/or to return results to the client via Web services interface 205. For example, in embodiments in which the system provides data storage services, in response to a query request that is accepted by admission control subsystem 210, service request subsystem 230 may access the table to which the query is directed and may return the query results to the client via Web services interface 205. In some embodiments, admission control subsystem 210 may be configured to throttle and otherwise manage service requests that have non-uniform workloads (e.g., adjusting a maximum request rate dependent on a current work throughput rate), as described herein. In other embodiments, this functionality may be provided by another component of the system, which may provide the maximum request rate to the admission control subsystem for use in throttling service requests. In some embodiments, admission control subsystem 210 may implement a "leaky bucket" based admission controller, as described in more detail below. In some embodiments, Web service interface 205 may utilize predefined instructions or communications, such as via defined application protocol interfaces (APIs), to communicate with admission control subsystem 210 and/or other components of computing system 200 on behalf of a client.

Note that in various embodiments, the components illustrated in FIGS. 1 and 2 may be implemented directly within computer hardware, as instructions directly or indirectly executable by computer hardware (e.g., a microprocessor or computer system), or as a combination of these techniques. For example, the components of the computing system 200 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 1 and/or FIG. 2.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in an admission control module or a similar component of another type of system that provides services to clients, and that is configured to receive, accept, and/or service requests on behalf of those clients.

As noted above, in some embodiments, overload protection (and/or other aspects of admission control) for a system that receives and services requests on behalf of clients may be implemented by a "leaky bucket" based admission controller. In such embodiments, the admission controller may use a maximum request rate parameter to decide, for example, how many requests per second (RPS) are allowed (i.e. the maximum number of service requests that can be accepted for servicing per second). For example, the value of a configurable "RPS-Cap" parameter may represent the maximum rate at which service requests can be accepted for servicing. In some embodiments, the admission controller may support bursting according to a burst-limit parameter. In such embodiments, the admission controller may allow a sudden burst of requests to be accepted, even if it causes the system to temporarily accept service requests at a rate that exceeds the current maximum request rate by a small amount (e.g., by an amount up to the amount specified by the burst-limit parameter).

In one example, if an RPS-Cap parameter is set at 100 (representing a maximum request rate of 100 requests per second), one service request token may be generated and/or placed it in the leaky token bucket every 10 milliseconds. In this example, each service request accepted for servicing consumes one token. In some embodiments, a service request that is received can only be accepted and serviced if the token bucket contains at least one token (or another pre-determined minimum number of tokens) when the service request is received. In this example, if a burst-limit parameter is set to a value of 3 (indicating that up to 3 tokens can be accumulated in the leaky bucket), a burst of up to 3 service requests may be accepted when the bucket is full.

In some embodiments, the systems and methods described herein may perform throttling and otherwise managing service requests that have non-uniform workloads by adjusting a maximum request rate dependent on a current work throughput rate. For example, in some embodiments the amount of work required to satisfy various service requests is non-uniform (e.g., the amount of work required to satisfy service requests may vary based on the type of request, the state of the targeted resources, or the specific results of the requested operation). However, if the work throughput rate is a limiting factor in the operation and/or performance of the system (e.g., due to technical capabilities, capacity, or bandwidth, or due to business and/or policy considerations, including various service level agreements), a targeted or committed work throughput level may not be guaranteed merely by enforcing a fixed limit on the rate at which requests are accepted for servicing.

For example, in a data storage system in which data is stored in tables on behalf of users, satisfying a request to access the table may require different amounts of work (e.g., in terms of I/O operations) depending on whether the request is a read access, a write access, or a query access, and/or depending on the amount of data returned in response to the request. Therefore, merely limiting the rate at which requests are accepted for servicing may not sufficiently limit the rate at which such work is performed in order to meet a target or committed work throughput rate and/or in order to satisfy the request along with other received (and accepted) requests. Similarly, in a system that provides computing resources from a pool of computing resources, satisfying a request to perform a computation may require different amounts of work (e.g., in terms of CPU cycles and/or I/O operations) depending on the particular computation to be performed. Therefore, merely limiting the rate at which requests are accepted for servicing may not sufficiently limit the rate at which such work is performed in order to meet a target or committed work throughput rate and/or in order to satisfy the request along with other received (and accepted) requests. In some such embodiments, the mechanisms and techniques described herein may serve to enforce a targeted or committed work throughput level by adjusting the rate at which requests are accepted for servicing based on the actual workload (e.g., the measured or observed work throughput rate) experienced in the system.

Figure 3:
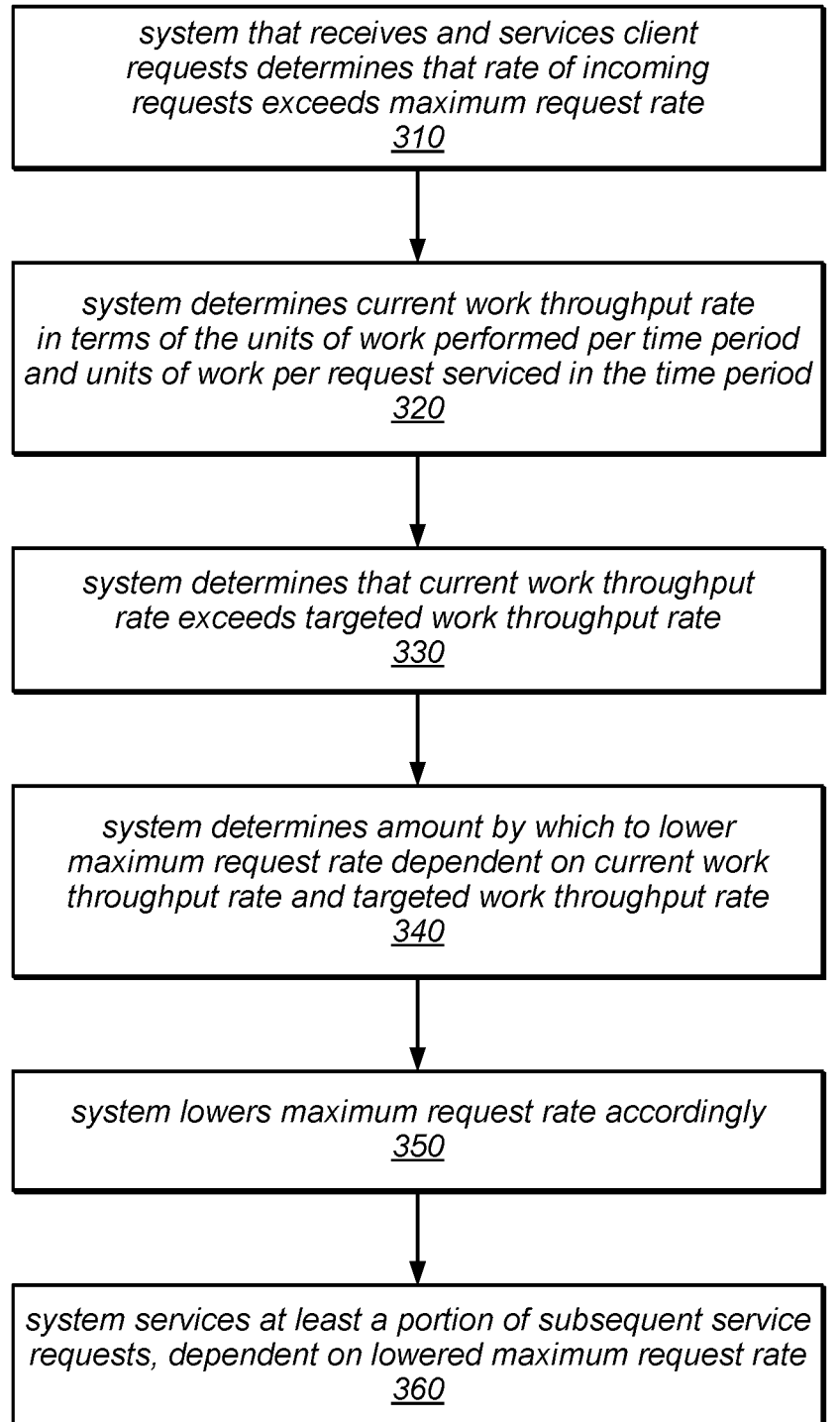
FIG. 3 is a flow diagram illustrating one embodiment of a method for adjusting a maximum request rate based, at least in part, on a committed work throughput rate and a current work throughput rate.

One embodiment of a method for adjusting a maximum request rate based, at least in part, on a targeted (or committed) work throughput rate and a current work throughput rate is illustrated by the flow diagram in FIG. 3. As illustrated in this example, the method may include a system that receives and services client requests determining that the rate at which requests are being received (i.e. the incoming request rate) exceeds the current maximum request rate, as in 310. For example, the system may determine that at least some of the incoming requests are being rejected rather than being accepted and/or serviced. The method may include the system determining the current work throughput rate (e.g., in terms of the number of units of work that are performed in a given time period), and the number of units of work performed per request during the time period (e.g., the number of units of work performed in order to satisfy the requests that are accepted and serviced), as in 320. In various embodiments, the system may measure the amount of work performed for each request, for each request that is received and/or serviced during a sample period, and/or for all of the requests that are received and/or serviced during a sample period. In some embodiments, the system may combine these measurements to generate a moving average value for the number of units of work performed during two or more sample periods and/or a moving average for the number of units of work performed per serviced request over the course of two or more sample periods. As described in more detail herein, such moving averages may be calculated using a technique that employs exponential smoothing, in some embodiments.

As illustrated in this example, the method may include the system determining that the current work throughput rate exceeds a pre-determined targeted/committed work throughput rate, as in 330. In other words, in this example, both the request rate and the work throughput rate exceed their target values. In this example, in response to the system being overloaded in this manner, the system may determine an amount by which to lower the maximum request rate dependent on the current work throughput rate and the targeted/committed work throughput rate, as in 340. For example, in some embodiments, the system may be configured to calculate an amount by which to lower the maximum request rate in order to meet the maximum request rate while also meeting the targeted/committed work throughput rate. The system may then lower the maximum request rate by the determined amount, as in 350. As described in more detail herein, the system may in some embodiments lower the maximum request rate in two or more increments that cumulatively result in lowering the maximum request rate by the determined amount, rather than lowering the maximum request rate by the determined amount in a single rate reduction operation. In other embodiments, the system may be configured to lower the maximum request rate by the determined amount in a single rate reduction operation Subsequent to lowering the maximum request rate (e.g., by the determined amount or by a smaller amount that contributes to lowering the maximum request rate by the determined amount), the system may service at least a portion of subsequent service requests, dependent on the lowered maximum request rate, as in 360. In other words, the system may accept and/or service requests that are received up to the lowered maximum request rate and may reject or otherwise fail to service requests received in excess of the lowered maximum request rate. In this example, after lowering the maximum request rate, the system may continue to reject a portion of subsequent incoming requests, but may operate with a work throughput rate that is less than or equal to the targeted/committed work throughput rate (or that is closer to the targeted/committed work throughput rate than it was before the maximum request rate was lowered).

In different embodiments, various calculations may be employed to adjust a maximum request rate based on the current workload. In one embodiment, when the measured work throughput rate exceeds the target (or committed) work throughput rate by X work units per second, the amount by which the maximum request rate is lowered may be calculated as $X/f/n$. In this example, f represents the number of work units per request (e.g., an observed, sampled, measured, averaged or otherwise aggregated number of work units performed in satisfying one or more previous service requests). In this example, n may represent the number of adjustment cycles over which the maximum request rate is to be lowered by the calculated amount (e.g., the number of adjustment cycles during which the maximum request rate is to be incrementally lowered before X reaches 0). In some embodiments, a value for n between 3-6 may allow the system to be reasonably responsive to changes in the workload. For example, setting $n=3$ may result in throttling down the rate at which requests are accepted for servicing fairly quickly, but with a relatively small risk of over-throttling. In this example, it is assumed that the current request rate (i.e. the actual RPS) is higher than the maximum request rate (i.e. the RPS-Cap) at the time. In this example, if $X=40$ (indicating that the current work throughput rate exceeds the target work throughput rate by 40 units of work per second), and $f=4$ (indicating that the average number of work units performed per request is 4), the RPS-Cap may be reduced by $40/4/3=3.3$ requests per second.

Figure 4:
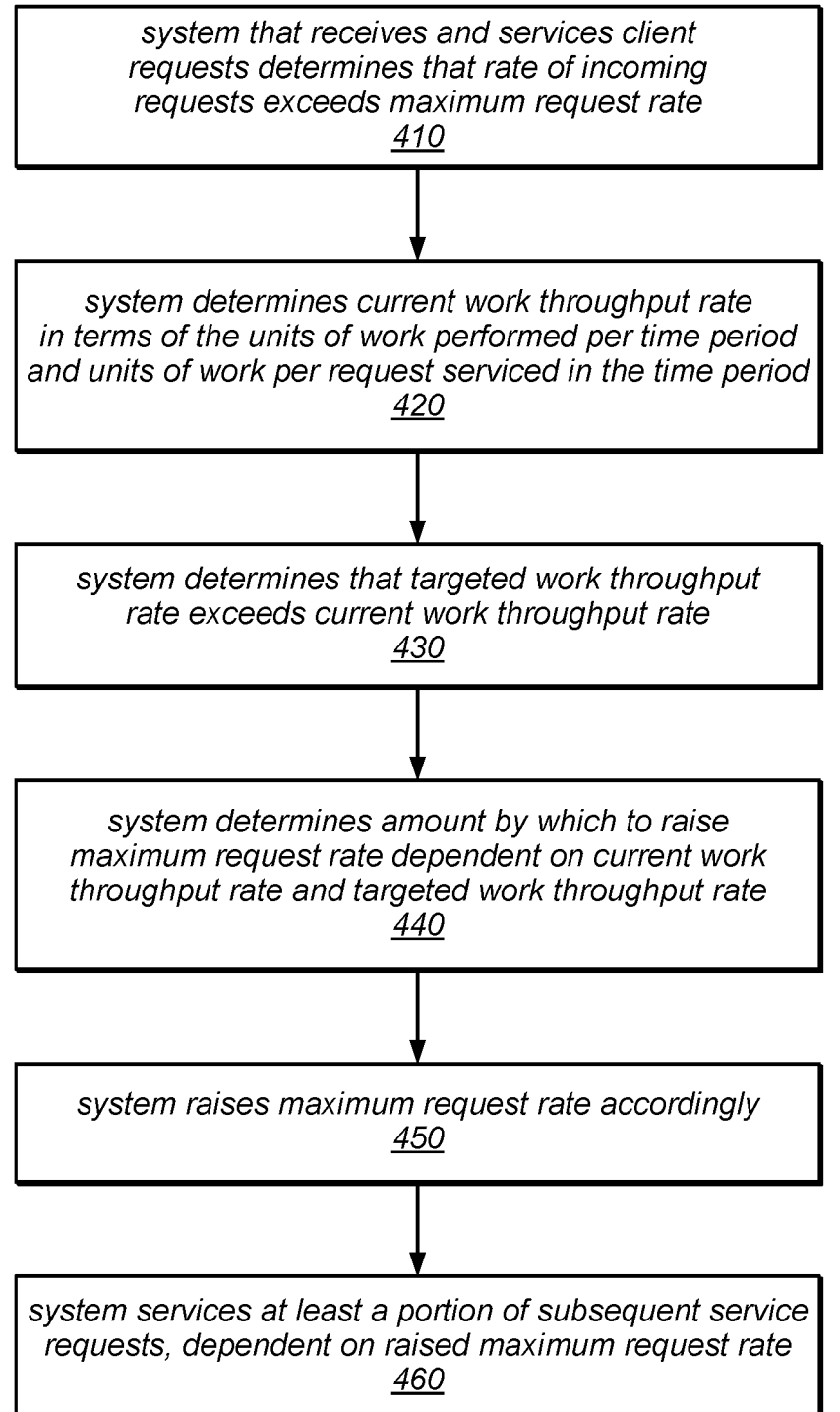
FIG. 4 is a flow diagram illustrating one embodiment of a method for raising a maximum request rate based, at least in part, on a targeted or committed work throughput rate and a current work throughput rate.

One embodiment of a method for raising a maximum request rate based, at least in part, on a targeted (or committed) work throughput rate and a current work throughput rate is illustrated by the flow diagram in FIG. 4. As illustrated in this example, the method may include a system that receives and services client requests determining that the rate at which requests are being received (i.e. the incoming request rate) exceeds the current maximum request rate, as in 410. For example, the system may determine that at least some of the incoming requests are being rejected rather than being accepted and/or serviced. The method may include the system determining the current work throughput rate (e.g., in terms of the number of units of work that are performed in a given time period), and the number of units of work performed per request during the time period (e.g., the number of units of work performed in order to satisfy the requests that are accepted and serviced), as in 420. In various embodiments, the system may measure the amount of work performed for each request, for each request that is received and/or serviced during a sample period, and/or for all of the requests that are received and/or serviced during a sample period. In some embodiments, the system may combine these measurements to generate a moving average value for the number of units of work performed during two or more sample periods and/or a moving average for the number of units of work performed per serviced request over the course of two or more sample periods. As described in more detail herein, such moving averages may be calculated using a technique that employs exponential smoothing, in some embodiments.

As illustrated in this example, the method may include the system determining that a pre-determined targeted/committed work throughput rate exceeds the current work throughput rate, as in 430. In other words, in this example, the request rate exceeds its target value, but the work throughput rate does not exceed its target value. In this example, in response to the system being under-loaded in terms of the targeted/committed work throughput rate, the system may determine an amount by which to raise the maximum request rate dependent on the current work throughput rate and the targeted/committed work throughput rate, as in 440. For example, in some embodiments, the system may be configured to calculate an amount by which to raise the maximum request rate in order to satisfy more incoming requests while still meeting the targeted/committed work throughput rate. In some embodiment, this calculation may also be dependent on the current rejection rate for received requests. The system may then raise the maximum request rate by the determined amount, as in 450. As in the previous example, the system may in some embodiments raise the maximum request rate in two or more increments that cumulatively result in raising the maximum request rate by the determined amount, rather than raising the maximum request rate by the determined amount in a single rate increasing operation. In other embodiments, the system may be configured to raise the maximum request rate by the determined amount in a single rate increasing operation Subsequent to raising the maximum request rate (e.g., by the determined amount or by a smaller amount that contributes to raising the maximum request rate by the determined amount), the system may service at least a portion of subsequent service requests, dependent on the raised maximum request rate, as in 460. In other words, the system may accept and/or service requests that are received up to the raised maximum request rate and may reject or otherwise fail to service requests received in excess of the raised maximum request rate. In this example, after raising the maximum request rate, the system may or may not continue to reject a portion of subsequent incoming requests, but may continue to operate with a work throughput rate that is less than or equal to the targeted/committed work throughput rate.

In one embodiment, when the measured work throughput rate is less than the target (or committed) work throughput rate by Y work units per second and the request rate exceeds the maximum request rate (e.g., at least some of the received requests are rejected), the system may be configured to raise the RPS-Cap by an amount calculated as Y/f/m. In this example, f again represents the number of work units per request (e.g., an observed, sampled, measured, averaged or otherwise aggregated number of work units performed in satisfying one or more previous service requests). In this example, m may represent the number of adjustment cycles over which the maximum request rate is to be raised by the calculated amount (e.g., the number of adjustment cycles during which the maximum request rate is to be incrementally raised before Y reaches 0). For example, in some embodiments, setting m=4 may result in raising the RPS-Cap more slowly than it would be lowered in the corresponding reduction operation described above (in which n=3), and may serve to avoid entering an overloaded state.

In some embodiments, it may be a policy or default case that the system does not raise the maximum request rate when the current work throughput rate is less than the targeted/committed work throughput rate unless at least some of the received requests are being rejected. By taking into consideration the fact that requests are being rejected, the system may avoid raising the RPS-Cap without reducing Y (which could lead to leaving RSP-Cap at its max value, and thus could result in entering an overloaded state). Note that in some cases, the current request rate (RPS) could be much lower than the maximum request rate (RPS-Cap) while still generating overload (with respect to a target or committed work throughput rate). Under these conditions, in some embodiments, the system may be configured to determine a proposed new, lower value for the maximum request rate (e.g., a proposal for what RPS-Cap should be when there are no rejections), and the calculation of that proposed new maximum request rate may not be dependent on the current maximum request rate.

Figure 5:
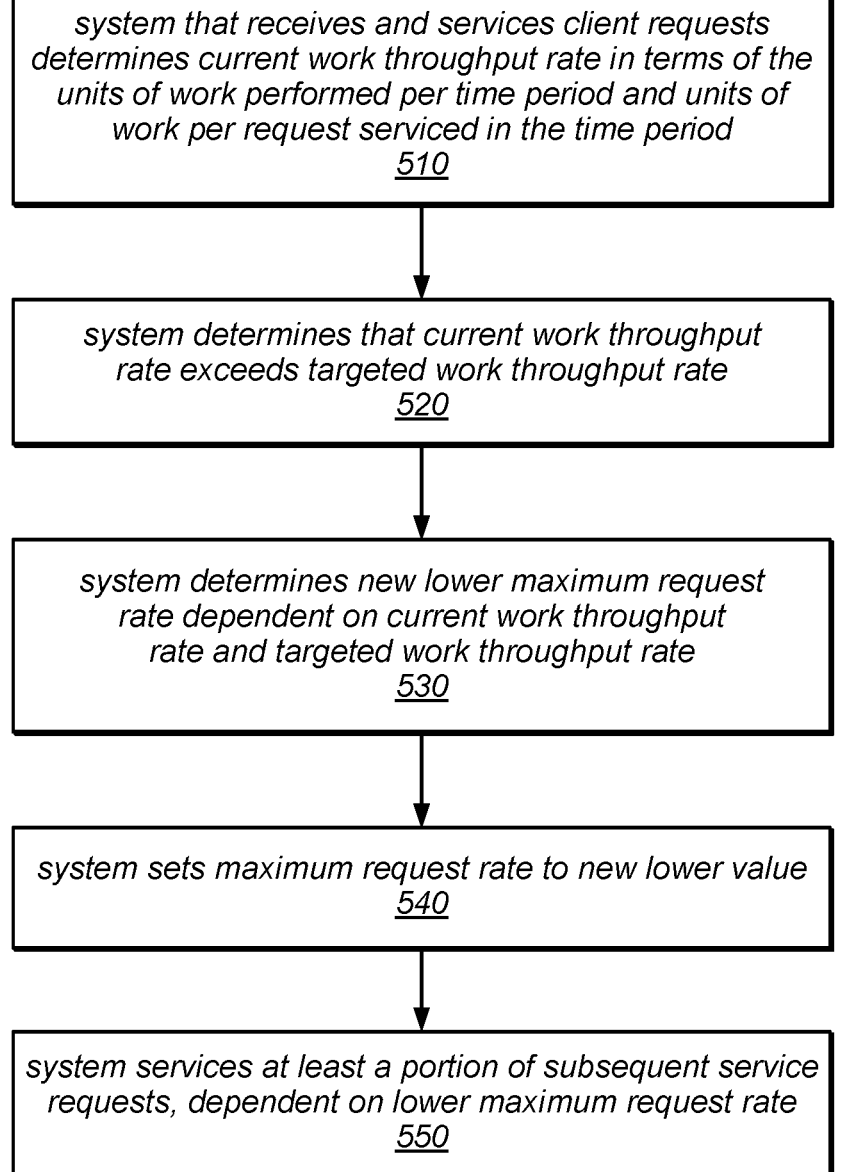
FIG. 5 is a flow diagram illustrating one embodiment of a method for adjusting a maximum request rate when the maximum request rate has not been exceeded.

One embodiment of a method for adjusting a maximum request rate when the maximum request rate has not been exceeded is illustrated by the flow diagram in FIG. 5. As illustrated in this example, the method may include the system determining the current work throughput rate (e.g., in terms of the number of units of work that are performed in a given time period), and the number of units of work performed per request during the time period (e.g., the number of units of work performed in order to satisfy the requests that are accepted and serviced), as in 510. In various embodiments, the system may measure the amount of work performed for each request, for each request that is received and/or serviced during a sample period, and/or for all of the requests that are received and/or serviced during a sample period. In some embodiments, the system may combine these measurements to generate a moving average value for the number of units of work performed during two or more sample periods and/or a moving average for the number of units of work performed per serviced request over the course of two or more sample periods. As described in more detail herein, such moving averages may be calculated using a technique that employs exponential smoothing, in some embodiments.

As illustrated in the example in FIG. 5, the method may include the system determining that the current work throughput rate exceeds a pre-determined targeted (or committed) work throughput rate, as in 520. In this example, it is assumed that the current request rate does not exceed the current maximum request rate. In other words, in this example, the request rate does not exceed its target value, but the work throughput rate exceeds its target value. In this example, in response to the system being overloaded in this manner (i.e. in terms of the work throughput rate), the system may determine a new lower maximum request rate dependent on the current work throughput rate and the targeted/committed work throughput rate, as in 530. For example, in some embodiments, the system may be configured to calculate a new lower maximum request rate in order to meet the targeted/committed work throughput rate. The system may then set the maximum request rate to the calculated value, as in 540. Note that in this example, rather than calculating an amount by which to change the maximum request rate (as in previous examples), the system is configured to determine a new (absolute) value for the maximum request rate.

Subsequent to setting the maximum request rate to the new maximum request rate, the system may service at least a portion of subsequent service requests, dependent on the new maximum request rate, as in 550. In other words, the system may accept and/or service requests that are received up to the new maximum request rate and may reject or otherwise fail to service requests received in excess of the new maximum request rate. In this example, after changing the maximum request rate, the system may reject a portion of subsequent incoming requests, but may operate with a work throughput rate that is less than or equal to the targeted/committed work throughput rate (or that is closer to the targeted/committed work throughput rate than it was before the maximum request rate was changed). In the case that the system rejects a portion of subsequent incoming requests subsequent to the change in the maximum request rate (e.g., if the change in the maximum request rate results in the current request rate exceeding the new maximum request rate), the method may include one or more further adjustments to the maximum request rate (not shown). For example, the system may be configured to apply the techniques illustrated in FIG. 3 or FIG. 4 and described herein to further adjust the maximum request rate such that the number of requests accepted and serviced is maximized while meeting both the maximum request rate and targeted/committed work throughput rate targets.

In one embodiment, the proposed new maximum request rate (i.e. the proposed RPS-Cap) may be calculated as s*L/f. In this example, f represents the number of work units per request (e.g., an observed, sampled, measured, averaged or otherwise aggregated number of work units performed per request in satisfying one or more previous service requests), s represents a safety factor used to avoid proposing a maximum request rate that is too low, and L represents the actual work throughput rate (e.g., an observed, sampled, measured, averaged or otherwise aggregated number of work units per second that were performed in satisfying the one or more previous service requests). In one example, the safety factor may be set as s=1.2. This may generate a new maximum request rate that is based on a work throughput rate that is 20% higher than the current work throughput rate. In various embodiments, the safety factor may be set based on a system-wide or client-specific default value, policy, or service level agreement, or it may be configurable (e.g., by a client or the admission controller) to tune the system during operation (e.g., to improve performance under changing conditions).

Figure 6:
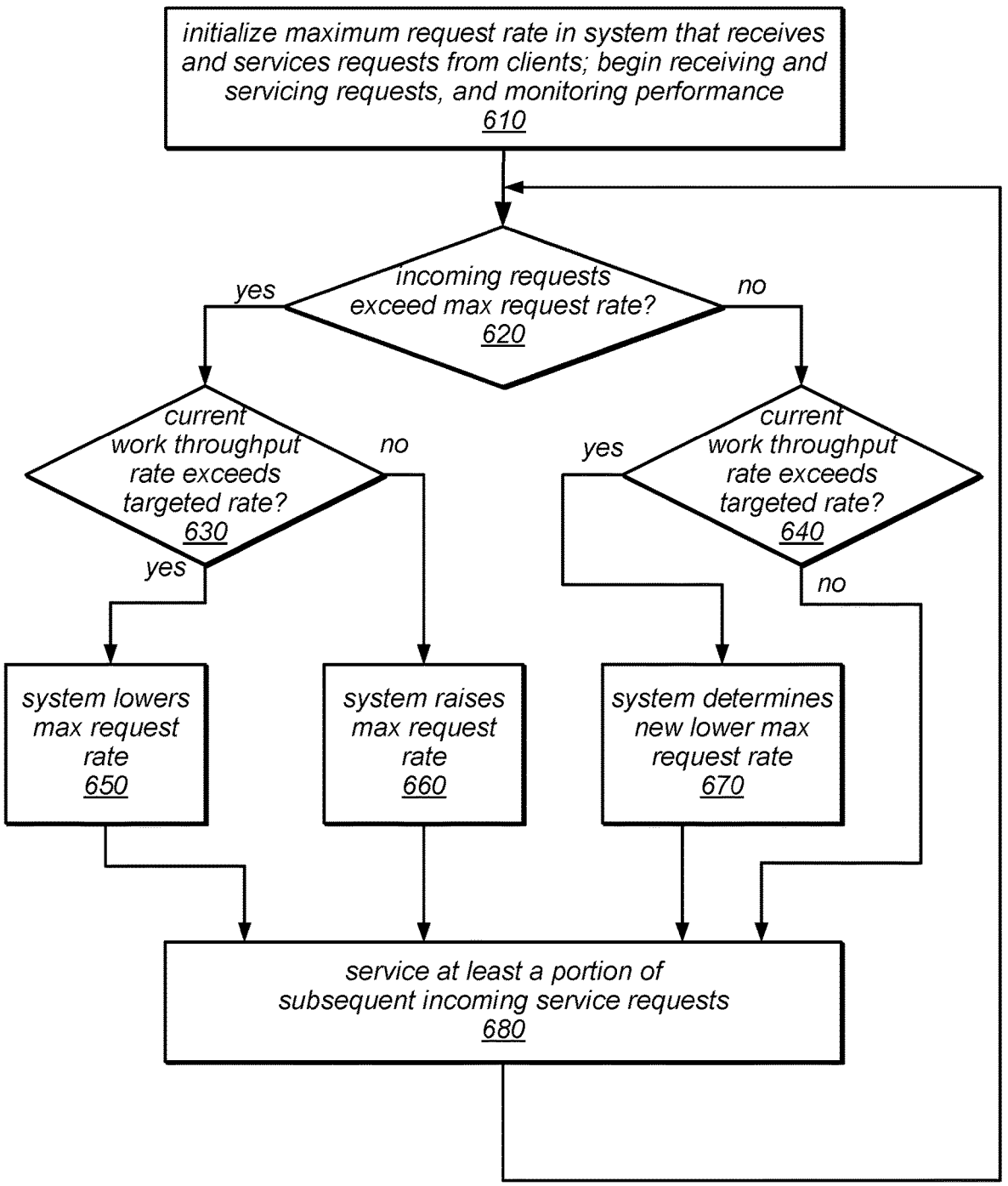
FIG. 6 is a flow diagram illustrating one embodiment of a method for dynamically adjusting a maximum request rate dependent on changes in the observed workload.

One embodiment of a method for dynamically adjusting a maximum request rate dependent on changes in the observed workload is illustrated by the flow diagram in FIG. 6. As illustrated at 610 in this example, the method may include a system that receives and services requests from clients initializing the maximum request rate, after which it begins to receive and service requests and monitor performance. For example, in various embodiments, an initial maximum request rate may be set based on a system-wide or customer/requestor-specific default, based on historical (e.g., average) performance data for a particular customer or requestor, by assuming that satisfying each request requires the maximum or minimum number of work units possible in the system, as a pre-determined percentage of the number of work units specified for the targeted/committed work throughput rate, or by any other suitable mechanism. After initializing the maximum request rate, the system may begin receiving and servicing requests, while monitoring and/or measuring the incoming request rate, the request acceptance rate and/or reject rate, the current work throughput rate, the number of work units per request or any other relevant performance indicators. In various embodiments, this may include sampling various performance indicators, calculating moving averages of various performance indicators, and/or measuring and/or aggregating relevant performance data using other suitable mechanisms.

In this example, if (e.g., based on results of the monitoring and/or measuring described above) the rate at which incoming requests are received exceeds the maximum request rate (shown as the positive exit from 620), and if the current work throughput rate exceeds the targeted/committed work throughput rate (shown as the positive exit from 630), the method may include the system lowering the maximum request rate (as in 650). For example, if the system is overloaded with respect to both the maximum request rate and the targeted/committed work throughput rate, the system may be configured to calculate the amount by which the maximum request rate is to be lowered (in one or more steps) based on the current work throughput rate and the targeted/committed work throughput rate, as described herein. In some embodiments, this may result in moving the system toward a state in which the targeted/committed work throughput rate is not exceeded (or to a state in which the actual work throughput rate is closer to the targeted/committed work throughput rate than it was prior to lowering the maximum request rate).

In the example illustrated in FIG. 6, if the rate at which incoming requests are received exceeds the maximum request rate (shown as the positive exit from 620), but the current work throughput rate does not exceed the targeted/committed work throughput rate (shown as the negative exit from 630), the method may include the system raising the maximum request rate (as in 660). For example, if the system is overloaded with respect to the maximum request rate but is under-loaded with respect to the targeted/committed work throughput rate, the system may be configured to calculate the amount by which the maximum request rate is to be raised (in one or more steps) based on the current work throughput rate and the targeted/committed work throughput rate, as described herein. In some embodiments, this may result in the system satisfying a higher percentage of incoming service requests while still meeting the targeted/committed work throughput rate.

In some embodiments, if the rate at which incoming requests are received does not exceed the maximum request rate (shown as the negative exit from 620), but the current work throughput rate exceeds the targeted/committed work throughput rate (shown as the positive exit from 640), the method may include the system determining a new (lower) maximum request rate (as in 670) and setting the maximum request rate to the new rate. For example, if the system is overloaded with respect to the targeted/committed work throughput rate, but not with respect to the maximum request rate, the system may be configured to calculate a new proposed maximum request rate (e.g., a lower maximum request rate) based on the current work throughput rate and the targeted/committed work throughput rate, as described herein. In some embodiments, setting the maximum request rate to this new proposed maximum request rate may result in moving the system toward a state in which the actual work throughput rate does not exceed the targeted/committed work throughput rate.

In the example illustrated in FIG. 6, if the rate at which incoming requests are received does not exceed the maximum request rate (shown as the negative exit from 620), and the current work throughput rate does not exceed the targeted/committed work throughput rate (shown as the negative exit from 640), there may be no change made to the maximum request rate based on the currently available performance data. Once any changes have been made to the maximum request rate due to current workload conditions (e.g., in 650, 660, or 670), or in response to determining that no change in the maximum request rate is needed, the method may include servicing at least a portion of subsequently received requests (incoming service requests), as in 680, according to the initial, raised, lowered, or newly determined maximum request rate in effect at the time (whether or not the maximum request rate has been adjusted due to the currently available performance data). The system may continue monitoring and/or measuring relevant performance indicators and dynamically adjusting the maximum request rate when appropriate. This is illustrated in FIG. 6 as the feedback from 680 to 620. For example, in some cases, setting the maximum request rate to a new lower maximum request rate (as in 670) may result in the incoming request rate exceeding the new lower maximum request rate. In this case, the maximum request rate may be further adjusted using the mechanisms illustrated in FIG. 6 following the path(s) from the negative exit from 620, as appropriate.

Note that while FIG. 6 illustrates an example embodiment in which compliance with the maximum request rate is determined first, followed by compliance with the target work throughput rate, in other embodiments, compliance with the target work throughput rate may be determined first, followed by compliance with the maximum request rate, or compliance with the target work throughput rate and compliance with the maximum request rate may be determined in parallel (e.g., by different performance monitoring components). In these and other embodiments, the respective actions depicted as 650-670 in FIG. 6 may be applied when the results of these determinations are similar to those of the corresponding combinations shown in FIG. 6, regardless of the order in which they are made.

Note that in some embodiments, in order to be conservative, the maximum request rate (RPS-Cap) may initially be set to a minimum value. For example, the initial maximum request rate may be calculated as C/F, where C is the targeted/committed work throughput rate, and F is the maximum possible number of units of work (e.g., the largest number of units of work that could be required to satisfy a single request in the system). Setting the maximum request rate to this minimum value may in some cases cause some initial throttling before the techniques described herein are applied to adjust the RPS-Cap to a more appropriate rate for the actual workload. In other embodiments, the RPS-Cap may initially be set to a maximum value, which in this example would be C. Setting the initial maximum request rate to this maximum value may require the system to throttle down quickly if the number of work units per request is larger than one. In still other embodiments, the initial value may be set to a value between the minimum and maximum values, based on the targeted/committed work throughput rate. For example, in one embodiment, the initial maximum request rate may be calculated as C*b where b is set to a value between 0 and 1 (e.g., 0.3).

In some embodiments, the techniques described herein for adjusting a maximum request rate based on the current workload may be applied periodically in the system. In one example, in a computing system that provides computing resources and/or storage services, an adjustment may be performed once every 100 milliseconds. In some embodiments, this adjustment cycle may allow the system to be reasonably responsive to changes in the actual workload. In other embodiments, an adjustment cycle may be shorter or longer than 100 milliseconds, depending on the type, number, and/or frequency of the requests to be serviced, the latency of the system, an average or typical amount of time needed to service requests, a business policy, a service level agreement, the desired responsiveness of the system, a configurable parameter value, and/or other factors.

As previously noted, some of the calculations described herein for determining an amount by which to adjust the maximum request rate or for determining a new maximum request rate based on the actual workload may be moving averages of measured or observed values captured during multiple sample periods (e.g., in a moving window of time). In some such embodiments, the sample period and/or the width of the moving window may be equal to (or a multiple of) the adjustment cycle for the system. In some embodiments, the system may use exponential smoothing when computing aggregate performance values (e.g., the average number of work units per request and the number of work units per second). For example, these averages may be calculated as:

$$S_t = \alpha * X_t + (1-\alpha) * S_{t-1}$$

In this example, a represents the smoothing factor, and it has a value between 0 and 1. Note that in some embodiments, the system may be configured to determine a rejection rate, which may also be calculated as a moving average with exponential smoothing. In some embodiments, the system may use a high alpha value when calculating the average rejection rate (e.g., 0.7). This may cause the rejection rate to decay quickly as the rejection rate measurements decline. This may allow the average rejection rate to quickly reflect whether the rejection rate is effectively zero. For example, in one embodiment, the rejection rate may be considered to be zero if the average rejection rate calculated as described herein is on the order of 10-9.

In various embodiments, the committed work throughput level for a given table maintained by a storage system on behalf of a user may be specified in terms of the work done during a given time period when a service request targets the table. For example, the committed throughput level may be expressed in terms of logical or physical I/O throughput (e.g., logical or physical I/O accesses per second) or logical CPU throughput (e.g., CPU cycles or instruction cycles per second), in some embodiments. Note that in some embodiments, a read access to the table may require only one I/O access (e.g., to read the data file of the table), while a write access to the table (e.g., an access that adds, deletes, or modifies an item or item attribute in the table) may require at least two I/O accesses (e.g., to log the write access, and then to perform the access). In addition, some individual service requests may read and/or write multiple items in the table. Therefore, in some embodiments, rather than specifying the committed work throughput rate in terms of a number of I/O operations per second (IOPS) or a number of service requests (i.e. API calls) per second, the committed work throughput rate may be specified in terms of a measure of normalized, logical work units (or logical service request units) over time.

In one example, the committed work throughput rate may be specified (in terms of normalized logical service request units) such that a service request that results in a read access targeting a single item in a table may be considered to require (or consume) one logical service request unit, while a service request that results in a write access targeting a single item in a table may be considered to require (or consume) two or three logical service request units. Note that in some embodiments, throughput levels may be specified differently for read requests and write requests (e.g., as a specified number of read accesses per second and a separately specified number of write accesses per second), and/or logical service request units consumed by read requests and write requests may be normalized based on the sizes of the items accessed by those requests. In yet another example, a different committed throughput level may be specified for read accesses performed under an eventual consistency model than for read accesses performed under a strong or strict consistency model.

In some embodiments, the work done by service requests that include multiple read and/or write accesses (e.g., a query or scan request that may return anywhere from 0 to 1 MB of data) may be modeled in terms of logical service request units, which may be dependent on the number of logical work units that are required to service those requests and/or on the size of the item or items accessed by each of those requests. In various embodiments, the number of physical I/O operations (e.g., memory accesses) actually performed when servicing the request may be a fixed or varying multiple of the number of logical service request units required (or consumed) when servicing the request. For example, in some embodiments the number of physical I/O operations performed when servicing a given request may on the order of twice the number of logical service request units required (or consumed) in servicing the request. As used herein, the terms "work units", "units of work", "logical service request units" and "logical service request units per second" may be used to describe these and any other suitable methods for measuring and/or specifying the work throughput level under a committed throughput model.

Figure 7:
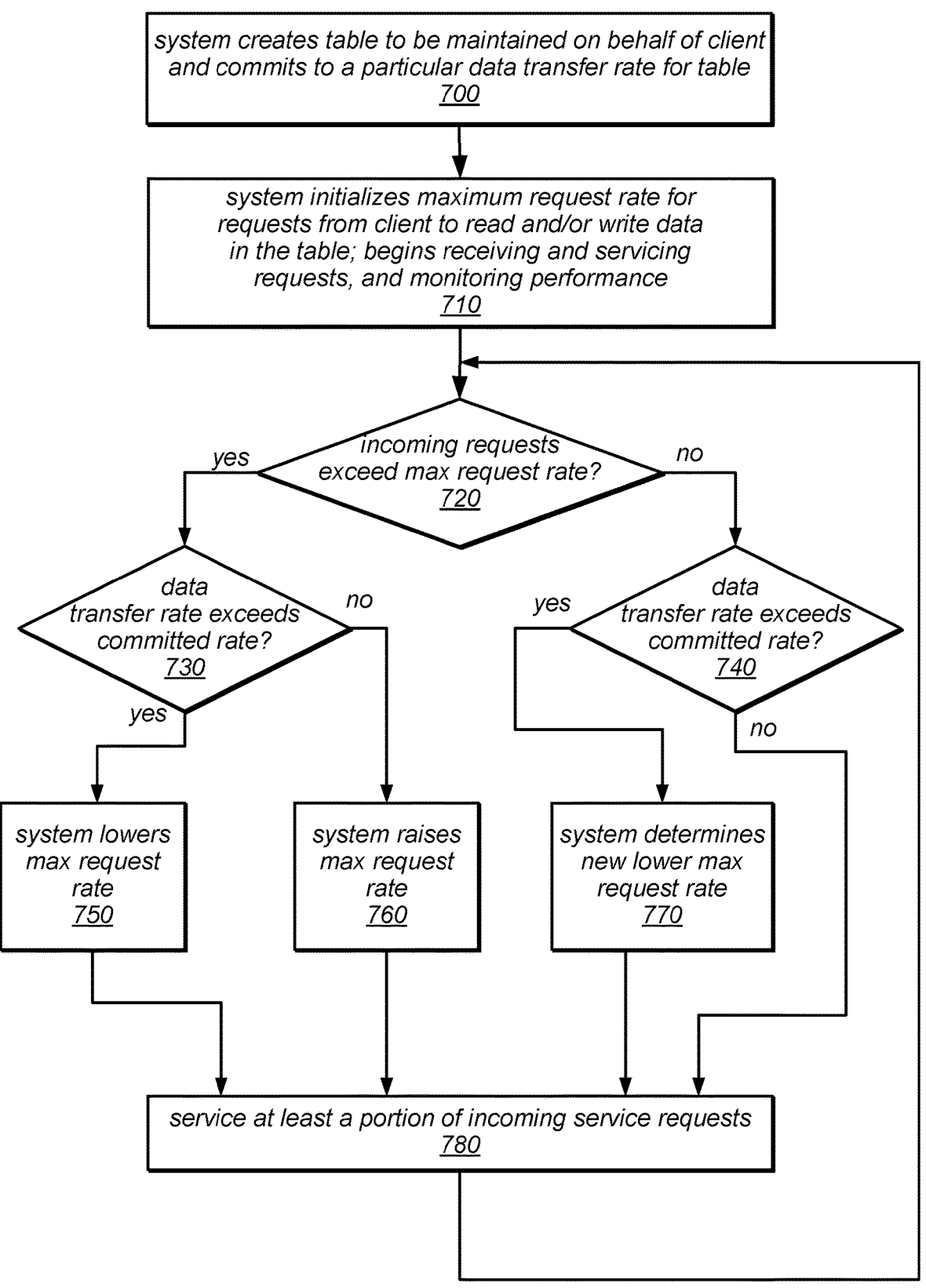
FIG. 7 is a flow diagram illustrating one embodiment of a method for dynamically adjusting a maximum request rate in a storage system dependent on the observed data transfer rate and dependent on a committed data transfer rate.

One embodiment of a method for dynamically adjusting a maximum request rate in a storage system (e.g., one that maintains data in tables on behalf of clients/subscribers of a data storage service) dependent on the observed data transfer rate and dependent on a committed data transfer rate is illustrated by the flow diagram in FIG. 7. As illustrated at 700 in this example, the method may include the storage system creating a table to be maintained on behalf of a client and committing to a particular data transfer rate for read and/or write accesses directed to the table (e.g., according to a service level agreement). In some embodiments, if the table is partitioned, the committed data transfer rate for accesses directed to the table may be divided by the number of partitions and the system may be configured to commit one portion of the divided data transfer rate to each of the partitions. For example, if the committed data transfer rate is 100 I/O operations per second for a given table and there are ten partitions for the table, the system may commit to a data transfer rate of 10 I/O operations per second for each of the ten partitions. Note that in some embodiments, there may be a different committed data transfer rate for read operations than for write operations, and (as noted above) read operations and write operations may consume different numbers of logical or physical I/O operations (and thus, different numbers of units of work). In some such embodiments, requests for read accesses and requests for write accesses (and/or adjustments to a maximum request rate for each of these types of accesses) may be managed separately (e.g., by separate admission controllers) using any of the techniques described herein.

As illustrated in this example, the method may include initializing the maximum request rate for requests from the client to read and/or write data in the table, as in 710. For example, in various embodiments, an initial maximum request rate may be set based on a system-wide or client-specific default, based on historical (e.g., average) data transfer rates in the system and/or for the client, by assuming that satisfying each request requires the maximum or minimum number of I/O operations possible in the system, as a pre-determined percentage of the number of I/O operations specified for the committed work throughput rate, or by any other suitable mechanism. After initializing the maximum request rate, the system may begin receiving and servicing requests to read and/or write data in the table, while monitoring and/or measuring the incoming request rate, the request acceptance rate and/or reject rate, the current data transfer rate (e.g., in terms of I/O operations per second), the number of I/O operations performed per request in satisfying various requests, or any other relevant performance indicators. In various embodiments, this may include sampling various performance indicators, calculating moving averages of various performance indicators, and/or measuring and/or aggregating relevant performance data using other suitable mechanisms.

In this example, if (e.g., based on results of the monitoring and/or measuring described above) the rate at which incoming requests are received exceeds the maximum request rate (shown as the positive exit from 720), and if the current data transfer rate exceeds the committed data transfer rate (shown as the positive exit from 730), the method may include the system lowering the maximum request rate (as in 750). For example, if the system is overloaded with respect to both the maximum request rate and the targeted/committed data transfer rate, the system may be configured to calculate the amount by which the maximum request rate is to be lowered (in one or more steps) based on the current data transfer rate and the committed data transfer rate, as described herein. In some embodiments, this may result in moving the system toward a state in which the target/committed data transfer rate is not exceeded (or to a state in which the actual data transfer rate is closer to the target/committed data transfer rate than it was prior to lowering the maximum request rate).

In the example illustrated in FIG. 7, if the rate at which incoming requests are received exceeds the maximum request rate (shown as the positive exit from 720), but the current data transfer rate does not exceed the committed data transfer rate (shown as the negative exit from 730), the method may include the system raising the maximum request rate (as in 760). For example, if the system is overloaded with respect to the maximum request rate but is under-loaded with respect to the targeted/committed data transfer rate, the system may be configured to calculate the amount by which the maximum request rate is to be raised (in one or more steps) based on the current data transfer rate and the committed throughput rate, as described herein. In some embodiments, this may result in the system satisfying a higher percentage of incoming service requests while still meeting the target/committed data transfer rate.

In some embodiments, if the rate at which incoming requests are received does not exceed the maximum request rate (shown as the negative exit from 720), but the current data transfer rate exceeds the committed transfer rate (shown as the positive exit from 740), the method may include the system determining a new (lower) maximum request rate (as in 770) and setting the maximum request rate to the new rate. For example, if the system is overloaded with respect to the targeted/committed data transfer rate, but not with respect to the maximum request rate, the system may be configured to calculate a new proposed maximum request rate (e.g., a lower maximum request rate) based on the current data transfer rate and the committed data transfer rate, as described herein. In some embodiments, setting the maximum request rate to this new proposed maximum request rate may result in moving the system toward a state in which the actual data transfer rate does not exceed the targeted/ committed data transfer rate.

In the example illustrated in FIG. 7, if the rate at which incoming requests are received does not exceed the maximum request rate (shown as the negative exit from 720), and the current data transfer rate does not exceed the committed data transfer rate (shown as the negative exit from 740), there may be no change made to the maximum request rate based on the currently available performance data. Once any changes have been made to the maximum request rate due to current workload conditions (e.g., in 750, 760, or 770), or in response to determining that no change in the maximum request rate is needed, the method may include servicing at least a portion of subsequently received service requests (e.g., incoming requests to read and/or write data to the table), as in 780, according to the initial, raised, lowered, or newly determined maximum request rate in effect at the time (whether or not the maximum request rate has been adjusted due to the currently available performance data). The system may continue monitoring and/or measuring relevant performance indicators and dynamically adjusting the maximum request rate when appropriate. This is illustrated in FIG. 7 as the feedback from 780 to 720. For example, in some cases, setting the maximum request rate to a new lower maximum request rate (as in 770) may result in the incoming request rate exceeding the new lower maximum request rate. In this case, the maximum request rate may be further adjusted using the mechanisms illustrated in FIG. 7 following the path(s) from the negative exit from 720, as appropriate.

Note that while FIG. 7 illustrates an example embodiment in which compliance with the maximum request rate is determined first, followed by compliance with the committed data transfer rate, in other embodiments, compliance with the committed data transfer rate may be determined first, followed by compliance with the maximum request rate, or compliance with the committed data transfer rate and compliance with the maximum request rate may be determined in parallel (e.g., by different performance monitoring components). In these and other embodiments, the respective actions depicted as 750-770 in FIG. 7 may be applied when the results of these determinations are similar to those of the corresponding combinations shown in FIG. 7, regardless of the order in which they are made.

In one example, in a system that provides data storage services to clients (e.g., maintaining data in one or more tables on behalf of clients), a write request may update up to 64 KB of data on disk (e.g., if the maximum item size is 64 KB), and a read request may read up to 1 MB of data. In this example, 2 KB may be chosen as the amount of data transferred for one unit of work (e.g., as the unit of work for I/O operations). In this example, a read request that reads up to 2 KB of data consumes one unit of read operations, and a 64 KB write request consumes 32 units of write operations. In other embodiments, a unit of work for I/O operations may be defined as 1 KB of transferred data, or any other arbitrary amount. In this example, the client may request (or be contractually allocated) a particular number of units of work for read operations and a particular number of units of work for write operations directed to a table being maintained by the service on behalf of the client (i.e. a committed work throughput rate for read operations and a separate committed work throughput rate for write operations). If the table is partitioned (e.g., using hashed base partitioning), each partition may be allocated an equal portion of the table level committed work throughput. In some such embodiments, write operations may be directed to all replicas, while consistent read operations may be directed to a master replica. For simplicity, the system may assign each replica the same committed work throughput as the corresponding partition level. A replica placement policy at a cluster level may be configured to ensure that storage nodes are not overloaded with respect to the committed work throughput rate of the replica stored on those nodes.

In this example, an adjustment may be made to the RPS-Cap and/or burst-limit parameter every 100 milliseconds, based on the current (i.e. most recently calculated) moving average number of I/O operations per recent request and the current (i.e. most recently calculated) request rate and/or rejection rate. In some embodiments, the calculations of the moving average number of I/O operations per request, current request rate, and/or current rejection rate may be calculated every 100 milliseconds as part of the adjustment cycle, while in other embodiments, these values may be calculated continuously or on a different cycle than the adjustment cycle.

In this example, if the measured work throughput rate (in terms of units of I/O per second) exceeds the committed work throughput rate by X units of work per second, the amount by which the maximum request rate is lowered may be calculated as X/f/n. As in previous examples, f represents the number of work units per request (e.g., an observed, sampled, measured, averaged or otherwise aggregated number of I/O operations performed in satisfying one or more previous service requests), and n represents the number of adjustment cycles over which the maximum request rate is to be lowered by the calculated amount (e.g., the number of adjustment cycles during which the maximum request rate is to be incrementally lowered before X reaches 0). In this example, it is assumed that the current request rate (i.e. the actual RPS) is higher than the maximum request rate (i.e. the RPS-Cap) at the time.

In this example, if the measured work throughput rate (in terms of units of I/O per second) is less than the target (or committed) work throughput rate by Y units of work and the request rate exceeds the maximum request rate (e.g., at least some of the received requests are rejected), the system may be configured to raise the RPS-Cap by an amount calculated as Y/f/m. Here, again, f represents the number of work units per request (e.g., an observed, sampled, measured, averaged or otherwise aggregated number of I/O operations performed in satisfying one or more previous service requests), and m represents the number of adjustment cycles over which the maximum request rate is to be raised by the calculated amount (e.g., the number of adjustment cycles during which the maximum request rate is to be incrementally raised before Y reaches 0). In this example, m may be set to a higher value than n, in order to adjust the RPS-Cap more slowly than in the rate reduction operation described above (e.g., to avoid entering an overloaded state).

In this example, if the current request rate (RPS) is much lower than the maximum request rate (RPS-Cap) while still generating overload (with respect to a target or committed work throughput rate), the system may be configured to determine a proposed new, lower value for the maximum request rate (e.g., a proposal for what RPS-Cap should be when there are no rejections). As in previous examples, the proposed new maximum request rate (i.e. the proposed RPS-Cap) may be calculated as s*L/f, where f represents the number of work units (e.g., the average number of 2 KB data transfers) per request, s represents a safety factor used to avoid proposing a maximum request rate that is too low, and L represents the actual work throughput rate (in terms of I/O work units per second). In one example, the RPS-Cap may be set to 10 requests per second, the average request rate may be 5 requests per second, and the committed work throughput (in terms of 2 KB data transfers per second) may be 100 work units per second (each representing a 2 KB data transfer). While the incoming requests average 2 KB (i.e. one work unit) per request, the system may not adjust the maximum request rate. However, if the workload changes such that the incoming requests (still being received at a rate of 5 requests per second) average 1 MB (i.e. 500 work units per request), the system may be configured to propose a new RPS-Cap as 1.2*2500/500, or 6 requests per second (assuming a safety factor of 20%). In this example, after the system sets the maximum request rate to 6 requests per second, other techniques may be applied to further lower the maximum request rate in order to meet the committed work throughput target.

In this example, exponential smoothing may be used in computing the average number of I/O operations (in terms of 2 KB data transfers) per request and the current work throughput rate (e.g., as an average of the number of I/O operations, in terms of 2 KB data transfers, per second). In this example, an alpha value of 0.7 is applied as the smoothing factor when calculating the average number of I/O operations per request, and an alpha value of 0.3 is applied as the smoothing factor when calculating the average number of I/O operations (in terms of 2 KB data transfers) per second. In various embodiments, such alpha values may be set based on a system-wide or client-specific default value, policy, or service level agreement, or may be configurable (e.g., by a client or the admission controller) to tune the system during operation (e.g., to improve performance under changing conditions).

In the example data storage system described above, if client is allocated a committed work throughput rate of 100 units of I/O (each representing a data transfer of up to 2 KB), and the average data transfer per request is determined to be 2 KB, the system may be configured to set the maximum request rate (RPS-Cap) to 100 requests per second. If the average data transfer per request is determined to be 100 KB, the system may be configured to set the maximum request rate (RPS-Cap) to 2 requests per second. If the average data transfer per request is determined to be 2 KB, but later rises to 100K, the system may be configured to lower the maximum request rate from 100 requests per second (using one or more adjustments over one or more adjustment cycle) to a maximum request rate equal to (or at least closer to) 2 requests per second, using any of the techniques described herein.

In some embodiments, overload protection for a storage node may be achieved using leaky bucket based admission controllers, such as those described herein. For each partition, the system may employ two such controllers: one for managing read requests and one for managing write requests. Each such controller may use a maximum request rate parameter to decide, for example, how many requests per second (RPS) are allowed (i.e. the maximum number of service requests that can be accepted for servicing per second). In some embodiments, each admission controller may support bursting according to a burst-limit parameter. In such embodiments, the admission controller may allow a sudden burst of requests to be accepted, even if it causes the system to temporarily accept service requests at a rate that exceeds the current maximum request rate by a small amount (e.g., by an amount up to the amount specified by the burst-limit parameter).

In some embodiments in which a system provides data storage services to clients (e.g., maintaining data in one or more tables on behalf of clients), one or more admission controllers may be placed in a hash tables with a partition identifier as the key. For example, one entry in such a table may specify that a write request (e.g., a PUT request) for a partition having a particular partition identifier should have a request rate of no more than 100 requests per second (RPS). In some embodiments, the system may employ a combined read-write controller and a dedicated write controller. This may allow the system to share the I/O capacity among read requests and write requests. In such embodiments, a linear formula may be used to convert read requests to a corresponding number of write requests (for the purposes of the admission controller, such as the application of its rules). For example, one read request may be converted to (or treated as) three write requests by the system. In embodiments in which a client requests (or is granted) a committed work throughput rate for read operations based on an eventual consistency model, the committed work throughput rate for each replica may be divided by two, since an eventually-consistent read request may be served by any replica.

Note that in some embodiments, there may be a risk that the network for a storage node may be saturated. In this case, an important message (such as heartbeat) may not get through in a timely fashion. In some embodiments, the storage node may decide to drop large read requests (such as range scans) to protect itself when it detects network saturation. In such embodiments, the request router and/or other storage node clients may apply throttling mechanisms similar to those described herein in order to avoid flooding a particular storage node. The admission controller framework described herein may in some embodiments be applied in these situations as well.

Figure 8:
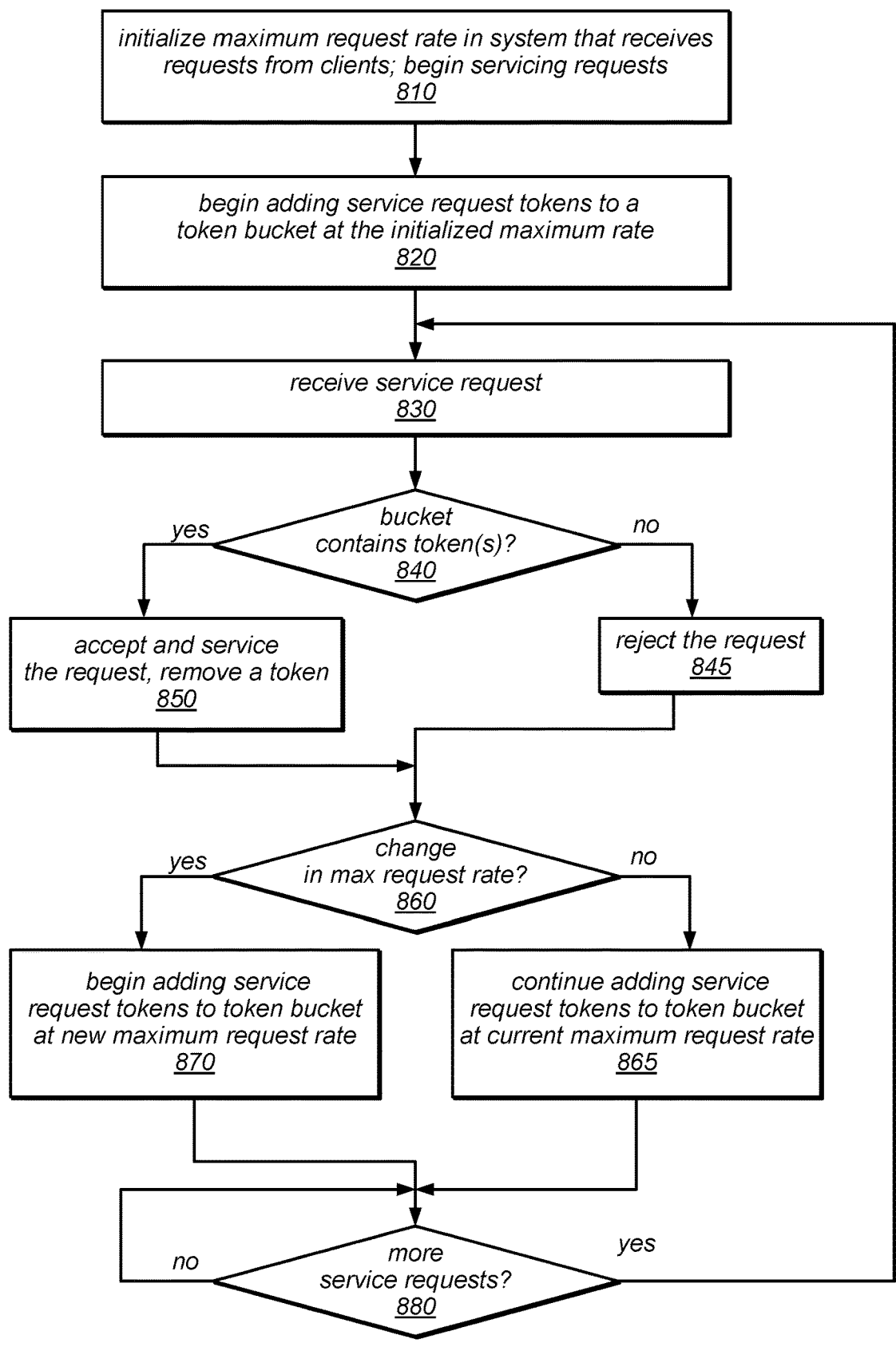
FIG. 8 is a flow diagram illustrating one embodiment of a method for managing service requests in a system that provides a committed work throughput rate.

One embodiment of a method for managing service requests in a system that provides a committed work throughput rate (e.g., a storage system that provides a committed data transfer rate for table accesses, or a system that performs other types of work in servicing other types of service requests) is illustrated by the flow diagram in FIG. 8. As illustrated at 810 in this example, the method may include initializing the maximum request rate in system that receives requests from clients (e.g., using one of the mechanisms described herein or any other suitable mechanism) and beginning to service at least a portion of incoming service requests (as in previous examples). In this example, the acceptance and/or rejection of service requests is controlled using a "leaky bucket" type admission control mechanism, as described above. In this example, the method may include beginning to add service request tokens to a token bucket at the initialized maximum rate, as in 820, and it is assumed that each service request (if accepted) consumes one service request token.

As illustrated in FIG. 8, the method may include receiving a service request (e.g., a request to read and/or write data to a table maintained in a storage system or another type of service request), as in 830. In this example, if the token bucket contains at least one token when the service request is received, shown as the positive exit from 840, the method may include accepting and servicing the service request, and removing a token from the token bucket, as in 850. If the token bucket does not contain at least one token when the service request is received, shown as the negative exit from 840, the method may include rejecting the request, as in 845. In other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors).

If, at some point, there is a change in the maximum request rate (shown as the positive exit from 860), the method may include beginning to add service request tokens to the token bucket at the new maximum request rate, as in 870. For example, the maximum request rate may be changed in response to the system exceeding the maximum request rate and/or a committed work throughput rate, and the change may move the system toward compliance with one or both of these constraints. As described herein, the change in the maximum request rate may be dependent on the current work throughput rate and the committed work throughput rate. Subsequent to such a change, the rate at which service request tokens are added to the token bucket may reflect the raised, lowered, or determined new maximum request rate. Note that in some embodiments, if such a change is made to the token generation rate, a corresponding change may be made to the maximum capacity of the token bucket (i.e. the number of tokens that are allowed to accumulate in the token bucket). For example, the maximum capacity of the token bucket may be constrained such that it corresponds to a fixed percentage of the number of requests that can be serviced per second, and the accumulation of tokens in the token bucket may allow the system to accept a burst of requests following a period of low service request traffic. If there is no change in the maximum request rate (shown as the negative exit from 860), the method may include continuing to add service request tokens to token bucket at the current (unchanged) maximum request rate, as in 865.

In the example illustrated in FIG. 8, as long as service requests are received, the system may dynamically adjust the maximum request rate (and, thus, the rate at which tokens are added to the token bucket) based on the current workload and/or other performance data. This is illustrated in FIG. 8 by the feedback from the negative exit from 880 back to 880 (illustrating that the system may wait to receive additional service requests) and the feedback from the positive exit from 880 to 830 (illustrating that the operations illustrated in 840-880 may be repeated if and when additional service requests are received). For example, if additional service requests are received, they may be accepted and serviced (if there are any service request tokens in the token bucket), or may be rejected (if not).

The admission control techniques described above may be suitable for managing service requests in a variety of systems that provide services to clients where the service requests have non-uniform workloads, in various embodiments. For example, they may be appropriate for managing service requests in systems that experience a wide range of workload behaviors, including relatively high work throughput rates and/or dynamically changing work throughput rates. However, in some embodiments they may not be as well suited for managing service requests in systems that experience relatively low work throughput and/or sudden or dramatic changes in the amount of work required to satisfy received requests (e.g., sudden or dramatic change in the average amount of work required per request). For example, the admission control mechanisms described above may not react quickly to sudden changes in the average number of I/O operations (or average amount of data transferred) per read or write request. In some embodiments, an admission control mechanism that throttles requests using a token bucket containing tokens that represent the amount of work performed in servicing requests (rather than the serviced requests themselves) may be more appropriate for managing service requests in these and other situations. In such embodiments, each token in the token bucket may represent a fixed amount of work (e.g., a unit of work), and the number of tokens consumed by various service requests may be dependent on the respective amount of work performed in servicing those requests.

In some embodiments, an admission control mechanism that uses work-based service request tokens may generate work-based tokens at a rate commensurate with a target or committed work throughput rate, such as those described herein. The admission control mechanism may accept and service a received request if at least one token (or another pre-determined minimum number of tokens) is present in the token bucket. Upon accepting the request, the admission control mechanism may deduct an initial number of work-based tokens from the bucket (e.g., a default number of tokens representing a default amount of work). If it is later determined that servicing the request required more work than the amount of work represented by the initially deducted tokens, the admission control system may deduct additional tokens from the bucket representing the additional amount work that was performed in servicing the request (e.g., the difference between the actual amount of work performed and the amount of work represented by the initially deducted tokens). Similarly, if it is later determined that servicing the request required less work than the amount of work represented by the initially deducted tokens, the admission control system may replace tokens in the bucket representing the difference between the actual amount of work performed and the amount of work represented by the initially deducted tokens. In some embodiments, a pre-determined number of work-based tokens (sometimes referred to herein as the maximum capacity for the token bucket) may be allowed to accumulate in the token bucket during periods of low request traffic (or during periods in which the serviced requests do not consume all of the available tokens in the token bucket).

In one example, the rate at which tokens are generated in the token bucket may set be at a fixed rate of 100 work units per second, based on a target work throughput rate of 100 work units per second. In this example, a token may be generated in the token bucket once every 10 milliseconds. In this example, the token bucket may have a maximum capacity of 50 tokens, which may be derived from a desire to allow requests received with a delay of up to 500 milliseconds (with respect to the target work throughput rate) to be accepted (e.g., during a burst). In some embodiments, the maximum bucket capacity may be constrained to be a value representing a fixed percent of the target work throughput rate (e.g., 5%). Note that in various embodiments, the target work throughput rate, the token generation rate, the maximum capacity of the token bucket, and/or the percentage of the target work throughput rate by which the maximum bucket capacity is constrained may be configurable and may be tuned based on testing or may be dynamically adjusted based on the performance of the system and/or behavior observed during the operation of the system. In this example, if 50 tokens are accumulated in the token bucket, the admission control mechanism may stop generating tokens (e.g., until and unless the number of tokens in the bucket drops below 50 due to the consumption of tokens by serviced requests).

In this example, a service request that is accepted for servicing is assumed to consume two units of work (and, thus, two tokens) when it is accepted for servicing. If the bucket contains at least one token (or another pre-determined minimum number of tokens) when the request is received, the request may be accepted for servicing (i.e. it may be allowed). After processing the request, if it is discovered that more than two units of work were required to satisfy the request (e.g., if N units of work were performing in processing the request, where N>2), the admission control mechanisms may deduct an additional N−2 tokens from the token bucket to reflect the actual amount of work that was performed in servicing the request. Alternatively, if it is discovered that less than two units of work was required to satisfy the request (e.g., if only one unit of work was performing in processing the request), the admission control mechanisms may replace one token in the token bucket to reflect the actual amount of work that was performed in servicing the request. Note that in some embodiments, the number of tokens in the token bucket, the number of tokens deducted from the token bucket, and the number of tokens added to the token bucket may always be an integer representing an integer number of work units. In other words, the granularity at which requests are managed using work-based service request tokens may be fixed at the amount of work that is currently defined to be one unit of work. Note that the bucket may be allowed to contain negative number of tokens, in some embodiments. However, no requests may be allowed (i.e. accepted for servicing) when the token count is negative or zero. This admission control mechanism may recover quickly from the effects of a variable workload (e.g., a widely variable amount of work required per request) as tokens are generated with the passing of time.

In some embodiments, when servicing a large request (e.g., a request for which a large amount of work must be performed in order to satisfy the request) the admission control mechanism may be configured to incrementally deduct work-based tokens from the token bucket while the request is being serviced, rather than waiting until the processing of the request is complete and deducting all of the additional tokens at once. Deducting at least a portion of the additional work-based tokens before the processing of the request is complete (and repeating such a partial deduction multiple times while the request is being processed) may provide timely feedback to the token bucket and/or admission control mechanism that the token bucket will be greatly depleted by the large request. Thus, the admission control mechanism may begin rejecting received requests prior to the processing of the large request being complete. In some embodiments, rather than initially deducting one token from the token bucket upon accepting a request for servicing by default, the admission control mechanism may use an estimated amount of work per request as the initial number of tokens to deduct from the token bucket upon acceptance, and may make up the difference (e.g., adjusting the number of tokens deducted from the token bucket in response to accepting and servicing the request by deducting additional tokens from the token bucket or replacing tokens in the token bucket) after processing of the request is complete. Other values for the initial number of tokens to deduct from the token bucket upon acceptance and/or methods for determining such a value may be employed in other embodiments.

Figure 9:
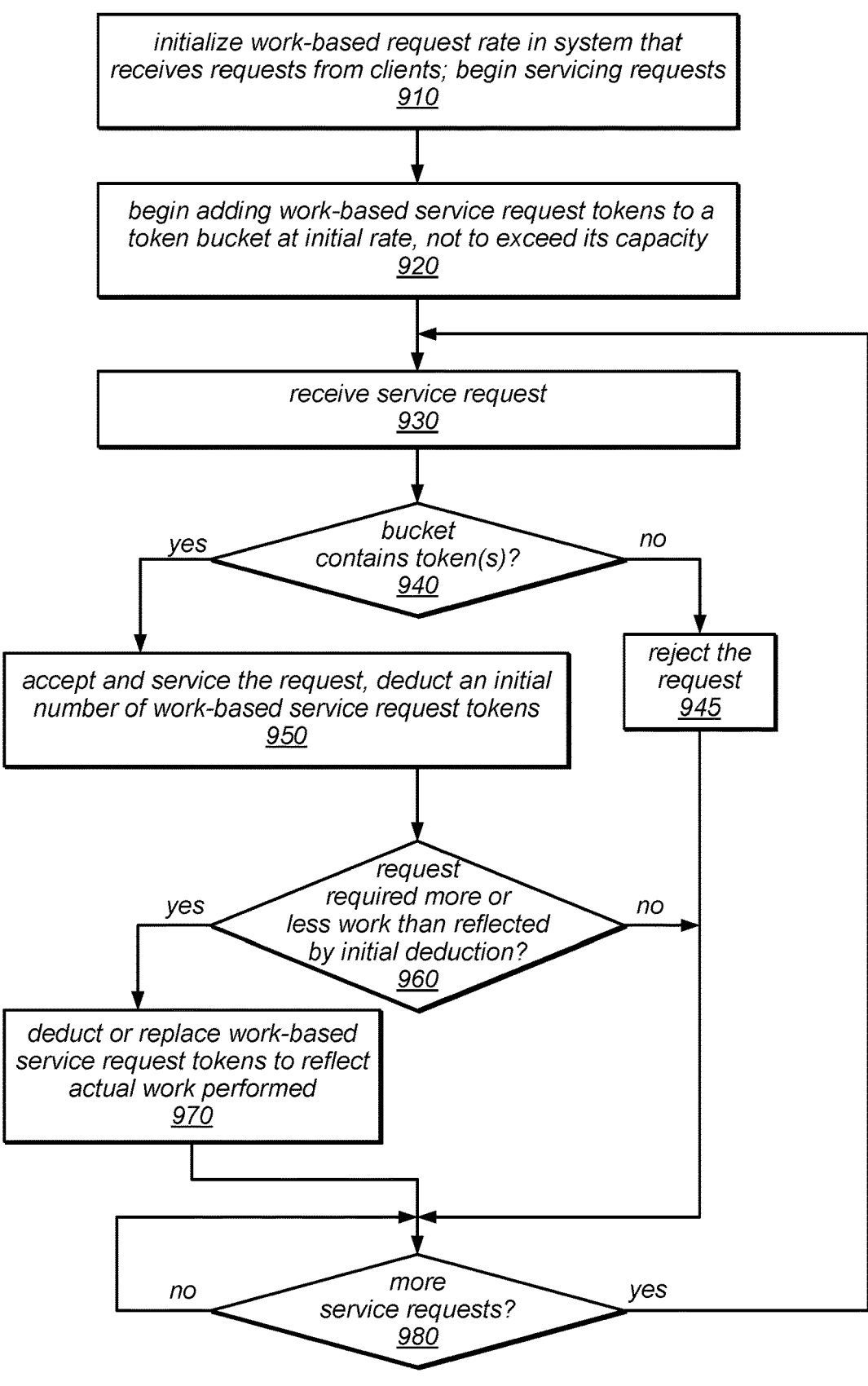
FIG. 9 is a flow diagram illustrating one embodiment of a method for managing service requests using work-based service request tokens.

FIG. 9 is a flow diagram illustrating one embodiment of a method for managing service requests using work-based service request tokens. As illustrated in this example, the method may include initializing a work-based request rate in a system that receives and services requests from clients, and beginning to service at least some of those requests, as in 910. For example, in some embodiments, the request rate may be expressed in terms of a work throughput rate, rather than as a rate at which requests can be accepted for servicing. In some embodiments, each token may represent a fixed amount of work (e.g., a work unit, as described above), and the request rate (or work throughput rate) may be expressed in terms of a number of work units to be performed per second. The method may include beginning to add work-based service request tokens to a token bucket at an initial token generation rate, as in 920, and continuing to add tokens to the token bucket at this initial token generation rate as long as a pre-determined maximum capacity for the token bucket is not reached and the token generation rate is not changed.

In some embodiments, the initial token generation rate may be dependent on the initial work-based request rate (or work throughput rate), which may represent a target or committed work throughput rate, such as those described herein. In various embodiments, the maximum capacity of the token bucket may be a fixed or configurable amount, and may be dependent on the target/committed work throughput rate. For example, it may be set to a value that represents a pre-determined percentage of the number of work units targeted for each second of operation, and this percentage may be a system-wide or client-specific default value, a user-selectable value, a fixed value, or a configurable value, in different embodiments.

In the example illustrated in FIG. 9, in response to receiving a service request (as in 930), the method may include determining whether there is at least one work-based token in the token bucket (as in 940). If so, shown as the positive exit from 940, the method may include accepting and servicing the request, as in 950. As described herein, servicing the request may include deducting an initial number of work-based service request tokens from the token bucket. For example, in some embodiments, upon accepting a request for servicing, one token may be deducted from the token bucket, regardless of the amount of work that it may take (or be expected to take) to satisfy the service request. If there are no tokens in the token bucket (i.e. if the number of tokens in the token bucket is negative or zero), shown as the negative exit from 940, the method may include rejecting the service request, as in 945. Note that in other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors).

If servicing the request required more or less work to be performed than the amount of work reflected by the initial token deduction (shown as the positive exit from 960), the method may include deducting one or more additional work-based service request tokens from the token bucket or replacing one or more work-based service request tokens in the token bucket to reflect the actual work performed, as in 970. For example, if the actual amount of work exceeded the amount reflected by the initial token deduction, the number of additional work-based service request tokens deducted may represent the difference between the actual amount of work performed in servicing the request and the amount of work represented by the initially deducted tokens. Similarly, if the actual amount of work was less than the amount reflected by the initial token deduction, the number of work-based service request tokens replaced in the token bucket may represent the difference between the actual amount of work performed in servicing the request and the amount of work represented by the initially deducted tokens. If servicing the request did not require more or less work to be performed than the amount of work reflected by the initial token deduction (shown as the negative exit from 960), no additional tokens may be deducted from the token bucket or added to the token bucket. For example, if the actual amount of work was equal to the amount of work represented by the initially deducted tokens, no additional changes may be made to the number of tokens in the token bucket in response to accepting and servicing the request.

Note that in some embodiments, additional work-based tokens may be deducted from the token bucket only if the amount of work performed in servicing the request was significantly greater than the amount of work represented by the initially deducted tokens (e.g., if the actual amount of work exceeded the amount of work represented by the initially deducted tokens by at least a pre-determined amount or percentage). In such embodiments, if the difference between the actual amount of work and the amount of work represented by the initially deducted tokens is relatively small (e.g., if the actual amount of work exceeded the amount of work represented by the initially deducted tokens by less than a pre-determined amount or percentage), no additional work-based tokens may be deducted from the token bucket in response to accepting and servicing the request. In other embodiments, additional work-based tokens may be deducted from the token bucket any time the amount of work performed in servicing the request is greater than the amount of work represented by the initially deducted tokens, regardless of the amount by which the actual work exceeded the amount of work represented by the initially deducted tokens. Similarly, in some embodiments, work-based tokens may be replaced in the token bucket only if the amount of work performed in servicing the request was significantly less than the amount of work represented by the initially deducted tokens (e.g., if the amount of work represented by the initially deducted tokens exceeded the actual amount of work by at least a pre-determined amount or percentage). In such embodiments, if the difference between the actual amount of work and the amount of work represented by the initially deducted tokens is relatively small (e.g., if the amount of work represented by the initially deducted tokens exceeded the actual amount of work by less than a pre-determined amount or percentage), no work-based tokens may be replaced in the token bucket in response to accepting and servicing the request. In other embodiments, work-based tokens may be replaced in the token bucket any time the amount of work represented by the initially deducted tokens exceeds the actual amount of work, regardless of the amount by which the amount of work represented by the initially deducted tokens exceeds the actual amount of work.

In the example illustrated in FIG. 9, as long as service requests are being received, the system may dynamically determine which, if any, requests to accept for servicing dependent on whether work-based service request tokens are present in the token bucket when the requests are received. This is illustrated in FIG. 9 by the feedback from the negative exit from 980 back to 980 (illustrating that the system may wait to receive additional service requests) and the feedback from the positive exit from 980 to 930 (illustrating that the operations illustrated in 940-970 may be repeated if and when additional service requests are received). In other words, if any additional service requests are received, they may be accepted and serviced (if there are any work-based service request tokens in the token bucket), or may be rejected (if not).

Note that in the example illustrated in FIG. 9, a service request is accepted for servicing if there is at least one token in the token bucket, regardless of the amount of work that might be expected to be performed to service that request (e.g., based on the average amount of work performed per request for recently serviced requests). However, in other embodiments, the minimum number of tokens that must be present in the token bucket in order for a received service request to be accepted for servicing may be greater than one. For example, the minimum number of tokens that must be present in the token bucket in order for a received service request to be accepted for servicing may be a pre-determined value greater than one, may be configurable at initialization of the system/service, and/or may be dynamically configurable during operation of the system/service. In some embodiments, if the initial number of tokens to be deducted upon accepting a request for servicing is greater than one, the method may include rejecting service requests if the number of tokens in the bucket when the requests are received is less than the initial number of tokens to be deducted upon accepting a request for servicing. For example, in some embodiments the method may include calculating the average amount of work performed per request when servicing requests in one or more sample periods, and the initial number of tokens to be deducted upon accepting a request for servicing may be set to (or may be dependent on) this value. In some embodiments, this value may be calculated continuously or periodically (e.g., as a moving average for the number of units of work performed per serviced request over the course of two or more sample periods). As previously noted, such moving averages may be calculated using a technique that employs exponential smoothing, in some embodiments.

In still other embodiments, the initial number of tokens to be deducted upon accepting a request for servicing may be set based on a historical work throughput rate, a historical average number of work units per request, user input, or a system-wide or client-specific default value other than one. In addition, as described in more detail below, if the amount of work is consistently (or frequently) much greater or much less than the amount of work reflected by the initial token deduction, the number of tokens to be deducted upon accepting a request may be raised or lowered accordingly.

Note that in some embodiments, if the target/committed work throughput rate changes (e.g., at any point during operation of the system), this may trigger a change in the rate at which work-based tokens are generated in the token bucket and/or the maximum capacity of the token bucket. As previously noted, the token generation rate, the maximum capacity of the token bucket, and/or the percentage of the target work throughput rate by which the maximum bucket capacity is constrained may be configurable, and may be changed during operation in response to user input, a change in the workload of the system (e.g., in the number, frequency, distribution and/or variability of received service requests and/or the amount of work required to satisfy those requests), a system-wide or client-specific policy, or other triggers, in various embodiments.

In some embodiments, an admission control mechanism that uses work-based tokens may be applied in a system that provides storage services to clients. For example, such an admission control mechanism may be appropriate for managing service requests in a storage system that experiences sudden or dramatic changes in the number of I/O operations required per request (e.g., a sudden or dramatic change in the average amount of data transferred in order to satisfy serviced requests). In one example, the token generation may be set at a fixed rate of 100 operations per second, which may correspond to a target (or committed) work throughput rate of 100 operations per second. Thus, a token may be generated in the token bucket once every 10 milliseconds. In this example, the maximum capacity of the token bucket may be constrained to a value that is 5% of the target number of I/O operations per second. Therefore, the token bucket may have a maximum capacity of 5 work-based tokens, after which the admission control mechanism may stop generating tokens.

In this example, a request is assumed to consume one I/O operation (thus, one token) when it is received. If the bucket contains at least one token (or another pre-determined minimum number of tokens) when the request is received, the request may be allowed. After processing the request, if it is determined that the request actually required N I/O operations (corresponding to the transfer of data in the amount of N times the I/O unit of work), the admission control mechanism may deduct an additional N–1 tokens from the token bucket to reflect the actual number of I/O operations (and the corresponding amount of data transferred) when servicing the request.

Figure 10:
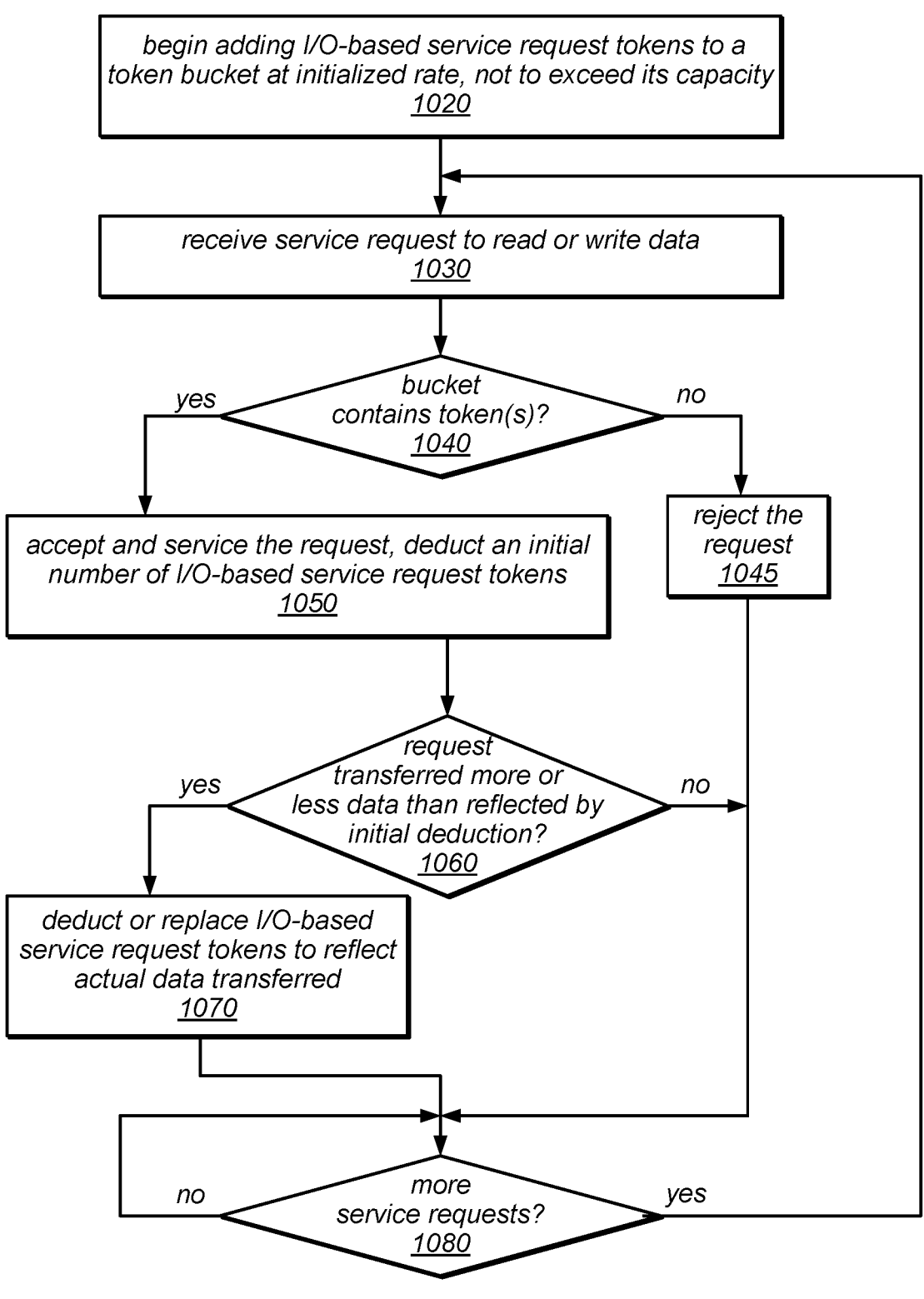
FIG. 10 is a flow diagram illustrating one embodiment of a method for managing service requests in a storage system using tokens representing input/output (I/O) operations.

FIG. 10 is a flow diagram illustrating one embodiment of a method for managing service requests in a storage system using tokens representing the work performed by input/output (I/O) operations (e.g., data transfers). In this example, the system may receive and service requests from clients based on a target work throughput rate expressed in terms of I/O operations per second (e.g., 100 I/O operations per second), where each unit of work for those I/O operations is defined as performing a data transfer for a fixed amount of data (e.g., 2 KB of data, or another fixed amount of data, which may be dependent on the available bandwidth in the system, or may represent a minimum, maximum, or typical amount of data transferred in response to the most basic read or write operations supported in the system). As illustrated in FIG. 10, the method may include beginning to add I/O-based service request tokens to a token bucket at an initial token generation rate, as in 1020, and continuing to add tokens to the token bucket at this initial token generation rate as long as a pre-determined maximum capacity for the token bucket is not reached and the token generation rate is not changed.

In some embodiments, the initial token generation rate may be dependent on an initial work throughput rate, which may represent a target or committed work throughput rate (e.g., the target/committed number of I/O operations per second). In various embodiments, the maximum capacity of the token bucket may be a fixed or configurable amount, and may be dependent on the target/committed work throughput rate. For example, it may be set to a value that represents a pre-determined percentage of the number of I/O operations targeted for each second of operation, and this percentage may be a system-wide or client-specific default value, a user-selectable value, a fixed value, or a configurable value, in different embodiments. In one example, if the target work throughput rate is 100 I/O operations per second and the maximum capacity of the bucket is set to 5% of this rate, a token may be generated once every 10 milliseconds until and unless 5 tokens accumulate in the token bucket. If 5 tokens accumulate in the token bucket, no additional tokens may be generated until the number of tokens in the token bucket drops back below 5 (e.g., due to the consumption of tokens by serviced requests). Note that in this example, setting the token bucket capacity to 5 may allow an I/O service request that is delayed by up to 50 milliseconds (with respect to the target work throughput rate, and a corresponding request rate) to be accepted.

In the example illustrated in FIG. 10, in response to receiving a service request to read or write data in the storage system (as in 1030), the method may include determining whether there is at least one I/O-based token in the token bucket (as in 1040). If so, shown as the positive exit from 1040, the method may include accepting and servicing the request, as in 1050. As described herein, servicing the request may include deducting an initial number of I/O-based service request tokens from the token bucket. For example, in some embodiments, upon accepting a request for servicing, one token (representing one unit of I/O work, e.g., the transfer of 2 KB of data) may be deducted from the token bucket, regardless of the amount of data that may be transferred (or that is expected to be transferred) to satisfy the service request. If there are no tokens in the token bucket (i.e. if the number of tokens in the token bucket is negative or zero), shown as the negative exit from 1040, the method may include rejecting the service request, as in 1045. Again note that in other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors).

If servicing the request required more or less data to be transferred than the amount of transferred data reflected by the initial token deduction (shown as the positive exit from 1060), the method may include deducting one or more additional I/O-based service request tokens from the token bucket or replacing one or more I/O-based service request tokens in the token bucket to reflect the actual amount of data transferred, as in 1070. For example, if the actual amount of data transferred exceeded the amount reflected by the initial token deduction, the number of additional I/O-based service request tokens deducted may represent difference between the actual amount of data transferred in servicing the request and the amount of transferred data represented by the initially deducted tokens. For example, if each token represents 2 KB of transferred data, an additional token may be deducted from the token bucket for each 2 KB of data that was transferred beyond the 2 KB of transferred data represented by the initial deduction of one token. Similarly, if the actual amount of data transferred was less than the amount reflected by the initial token deduction, the number of I/O-based service request tokens replaced in the token bucket may represent the difference between the actual amount of data transferred in servicing the request and the amount of transferred data represented by the initially deducted tokens. If servicing the request did not require more or less data to be transferred than the amount of transferred data reflected by the initial token deduction (shown as the negative exit from 1060), no additional changes may be made in the number of tokens in the token bucket in response to accepting and servicing the request. In some embodiments, additional tokens may only be deducted from or replaced in the token bucket if the difference between the actual amount of data transferred in servicing the request and the amount of transferred data represented by the initially deducted tokens is greater than a predetermined amount or percentage. In other embodiments, adjustments may be made to the number of tokens in the token bucket in response to accepting and servicing a request any time the actual amount of data transferred in servicing the request is different than the amount of transferred data represented by the initially deducted tokens.

In the example illustrated in FIG. 10, as long as service requests are being received, the system may dynamically determine which, if any, requests to accept for servicing dependent on whether I/O-based service request tokens are present in the token bucket when the requests are received. This is illustrated in FIG. 10 by the feedback from the negative exit from 1080 back to 1080 (illustrating that the system may wait to receive additional service requests) and the feedback from the positive exit from 1080 to 1030 (illustrating that the operations illustrated in 1040-1070 may be repeated if and when additional service requests are received). In other words, if any additional service requests are received, they may be accepted and serviced (if there are any I/O-based service request tokens in the token bucket), or may be rejected (if not).

Note that in the example illustrated in FIG. 10, as in the previous example, a service request may be accepted for servicing if there is at least one token in the token bucket, regardless of the amount of data that might be expected to be transferred in order to service that request (e.g., based on the average amount of data transferred per request for recently serviced requests). However, in other embodiments, if the initial number of tokens to be deducted upon accepting a request for servicing is greater than one, the method may include rejecting service requests if the number of tokens in the bucket when the requests are received is less than the initial number of tokens to be deducted upon accepting a request for servicing. For example, in some embodiments the method may include calculating the average amount of data transferred per request when servicing requests in one or more sample periods, and the initial number of tokens to be deducted upon accepting a request for servicing may be set to (or may be dependent on) this value. In some embodiments, this value may be calculated continuously or periodically (e.g., as a moving average for the number of units of I/O work performed per serviced request over the course of two or more sample periods). As previously noted, such moving averages may be calculated using a technique that employs exponential smoothing, in some embodiments.

In some embodiments, the initial number of tokens to be deducted upon accepting a request for servicing by an admission control mechanism in a system that provides storage services may be set based on a historical data transfer rate, a historical average number of I/O work units per request (i.e. a historical average amount of data transferred per request), user input, or a system-wide or client-specific default value other than one. In addition, if the amount of data transferred is consistently (or frequently) much greater or much less than the amount of transferred data reflected by the initial token deduction, the number of tokens to be deducted upon accepting a request and/or the minimum number of tokens that must be present in the token bucket in order to accept a request for servicing may be raised or lowered accordingly. In such embodiments, received requests may be accepted for servicing (or rejected) based on the current minimum number of tokens (e.g., as originally configured or as subsequently modified) when the request is received.

In some embodiments, if the target/committed work throughput rate changes (e.g., if the target/committed data transfer rate changes at any point during operation of the system), this may trigger a change in the rate at which work-based tokens are generated in the token bucket and/or the maximum capacity of the token bucket. As previously noted, the token generation rate, the maximum capacity of the token bucket, the minimum number of tokens that must be present in the token bucket in order to accept a request for servicing, and/or the percentage of the target work throughput rate (e.g., in terms of I/O operations per second) by which the maximum bucket capacity is constrained may be configurable, and may be changed during operation in response to user input, a change in the workload of the system (e.g., in the number, frequency, distribution and/or variability of received service requests and/or the amount of data to be transferred in order to satisfy those requests), a system-wide or client-specific policy, or other triggers, in various embodiments.

In some embodiments, when servicing a large request (e.g., a request for which a large amount of data must be transferred in order to satisfy the request) the admission control mechanism may be configured to incrementally deduct work-based tokens from the token bucket while the request is being serviced, rather than waiting until the processing of the request is complete and deducting all of the additional tokens at once. In one example, a large request may require that 1 MB of data be read, and each token in the bucket may represent a 1 KB data transfer. In this example, the storage system may be able to read up to 64 KB at a time, and each read may take 1 millisecond. Thus, the large request may require 16 read operations, each reading 64 KB of data, to return a total of 1 MB of data, and processing the large request may take a total of 16 milliseconds. In this example, rather than deducting 1024 tokens from the bucket after 16 milliseconds, the admission control mechanism may be configured to deduct 64 tokens from the token bucket after each 64 KB read (i.e. once per millisecond). By deducting tokens incrementally and/or early for the large request (i.e. prior to completion of the request processing), the admission control mechanism may react quickly (after 1 millisecond, in this case) to disallow (i.e. reject) future requests while the large request is being processed, rather than potentially continuing to accept requests until the processing is complete (e.g., after 16 milliseconds). As illustrated by this example, deducting at least a portion of the additional work-based tokens before the processing of the request is complete (and repeating such a partial deduction multiple times while the request is being processed) may provide timely feedback to the token bucket and/or admission control mechanism that the token bucket will be greatly depleted by the large request. Thus, the admission control mechanism may begin rejecting received requests prior to the processing of the large request being complete.

In some embodiments, rather than initially deducting one token from the token bucket upon accepting a request for servicing by default, the admission control mechanism may use an estimated amount of data to be transferred per request as the initial number of tokens to deduct from the token bucket upon acceptance, and may make up the difference (e.g., adjusting the number of I/O-based service request tokens deducted from the token bucket in response to accepting and servicing the request by deducting additional tokens from the token bucket or replacing tokens in the token bucket) after processing of the request is complete. Other values for the initial number of tokens to deduct from the token bucket upon acceptance or methods for determining such a value may be employed in other embodiments.

Figure 11:
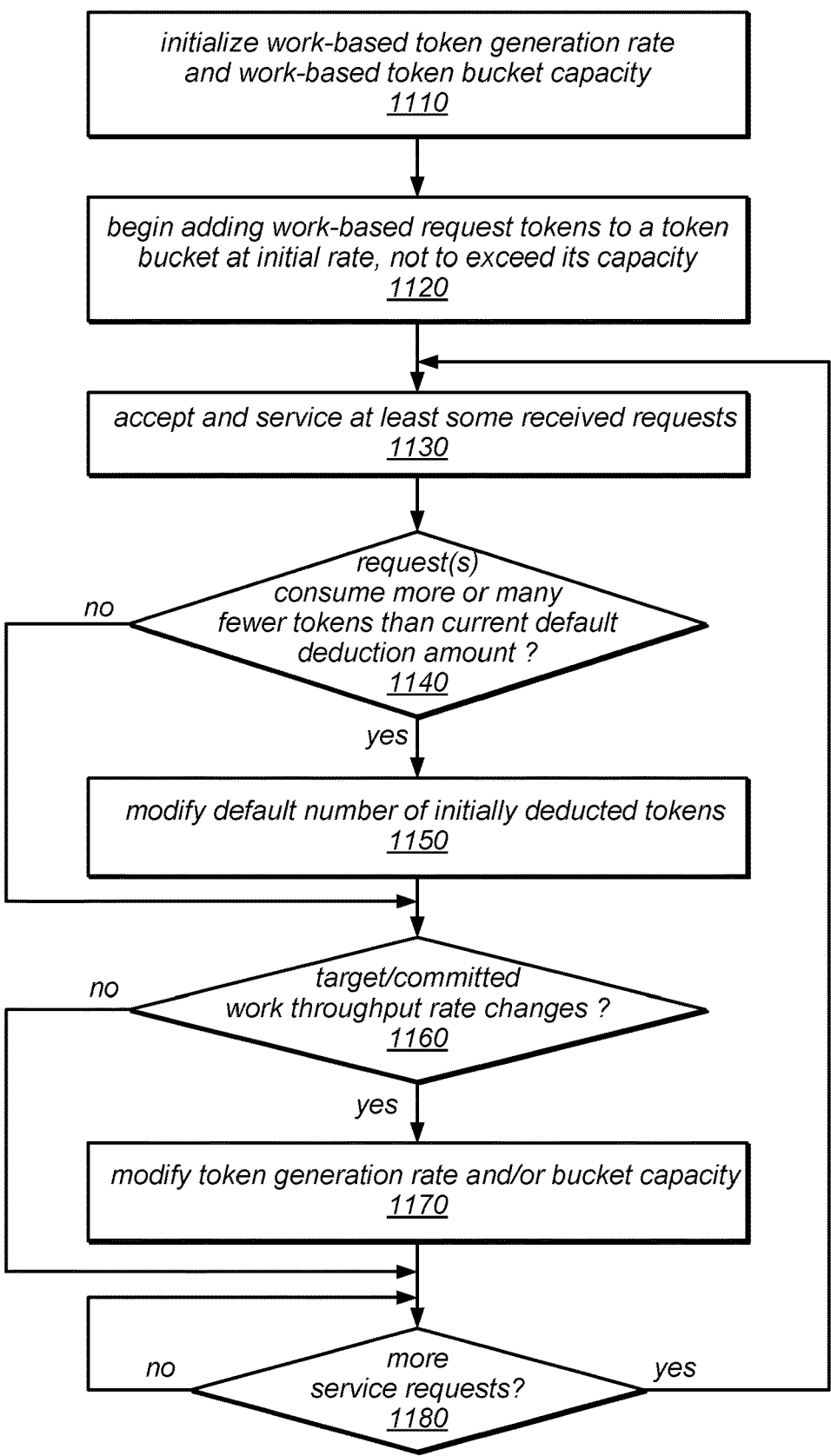
FIG. 11 is a flow diagram illustrating one embodiment of a method for dynamically adjusting a work-based token generation rate and/or a work-based token deduction rate for admission control.

In some embodiments, the target/committed work throughput rate may change during operation, and this may trigger a change in the rate at which work-based tokens are generated in the token bucket and/or the maximum capacity of the token bucket. For example, the target/committed work throughput rate may change based on a system-wide or client-specific policy, or in response to a change in the capacity or availability of resources in the system, a change in priority for a client or system resources, a client request, a change in a service level agreement, or other triggers. Similarly, a change in the workload observed by the system may trigger a change in the rate at which work-based tokens are generated in the token bucket and/or the maximum capacity of the token bucket. FIG. 11 is a flow diagram illustrating one embodiment of a method for dynamically adjusting a work-based token generation rate and/or a work-based token deduction rate for admission control in a system that receives and services requests on behalf of clients. As illustrated in this example, the method may include initializing a work-based token generation rate and a work-based token bucket capacity, as in 1110. As described herein, the token generation rate may in some embodiments be the same as (or based on) a target (or committed) work-based request rate (i.e. a target or committed work throughput rate). The method may include beginning to add work-based request tokens to a token bucket at the initial token generation rate, while not exceeding the initial token bucket capacity, as in 1120.

As illustrated at 1130 in FIG. 11, the method may include accepting and servicing at least a portion of received requests, according to the admission control mechanisms described herein that employ work-based service request tokens. For example, requests may be accepted for servicing if at least one token is present in the token bucket when the requests are received, and servicing a request may include deducting an initial (e.g., a default or standard) number of tokens from the bucket, determining whether the amount of work performed in servicing the request was greater than the amount of work represented by the initially deducted tokens, and (if so) deducting one or more additional work-based tokens to reflect the additional work. Again note that in some embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors).

In this example, if one or more serviced requests consume more or a great deal fewer tokens than the current default number of tokens, shown as the positive exit from 1140, the method may include modifying the default number of initially deducted tokens (e.g., the number of tokens that are initially deducted when a request is accepted for servicing), as in 1150. For example, if the amount of work required to satisfy accepted service requests is consistently (or frequently) significantly less than the amount of work reflected by the initial token deduction (e.g., if the amount of work represented by the initial token deduction typically exceeds the amount of work required to service requests by at least a pre-determined amount or percentage and/or if tokens are often replaced in the token bucket following the servicing of requests to reflect the actual amount of work performed in servicing the requests), the default number of tokens initially deducted when a request is accepted for servicing may be lowered. Conversely, if the amount of work required to satisfy accepted service requests is consistently (or frequently) greater than the amount of work reflected by the initial token deduction (e.g., if the amount of work required to service requests typically exceeds the amount of work represented by the initial token deduction by at least a pre-determined amount or percentage and/or if additional tokens are often deducted from the token bucket following the servicing of requests to reflect the actual amount of work performed in servicing the requests), the default number of tokens initially deducted when a request is accepted for servicing may be raised. As previously noted, in some embodiments, the default number of tokens initially deducted when a request is accepted for servicing may be dynamically adjusted based on the average amount of work required per request (e.g., as measured or observed for multiple serviced requests over one or more sample periods). In some embodiments, if recently serviced requests do not typically (or frequently) consume more or many fewer tokens than the current default number of initially deducted tokens (shown as the negative exit from 1140), no change may be made to the current default number of initially deducted tokens. In other words, while the difference between the amount of work typically required to service requests and the amount of work represented by the initial token deduction is less than a pre-determined amount or percentage and/or while adjustments in the number of tokens the token bucket following the servicing of requests to reflect the actual amount of work performed in servicing the requests are rarely performed, there may be no changes made to the default number of initially deducted tokens.

As illustrated in this example, the method may include determining that the target/committed work throughput rate has changed, as in 1160. If so, shown as the positive exit from 1160, the method may include modifying the token generation rate and/or the maximum token bucket capacity, as in 1170. For example, in some embodiments, the token generation rate may be raised or lowered to track the change in the target/committed work throughput rate, and the maximum capacity of the token bucket may be reset based a fixed percentage of the target/committed work throughput rate or the modified token generation rate. In this example, while the target/committed work throughput rate remains unchanged, there may be no change to the token generation rate and/or the maximum token bucket capacity.

In the example illustrated in FIG. 11, as long as service requests are being received, the system may continue to receive and service at least a portion of the service requests it receives dependent on whether I/O-based service request tokens are present in the token bucket when the requests are received. This is illustrated in FIG. 11 by the feedback from the negative exit from 1180 back to 1180 (illustrating that the system may wait to receive additional service requests) and the feedback from the positive exit from 1180 to 1130 (illustrating that the operations illustrated in 1140-1170 may be repeated if and when additional service requests are received). In other words, if any additional service requests are received, they may be accepted and serviced (if there are any I/O-based service request tokens in the token bucket), or may be rejected (if not).

Figure 12:
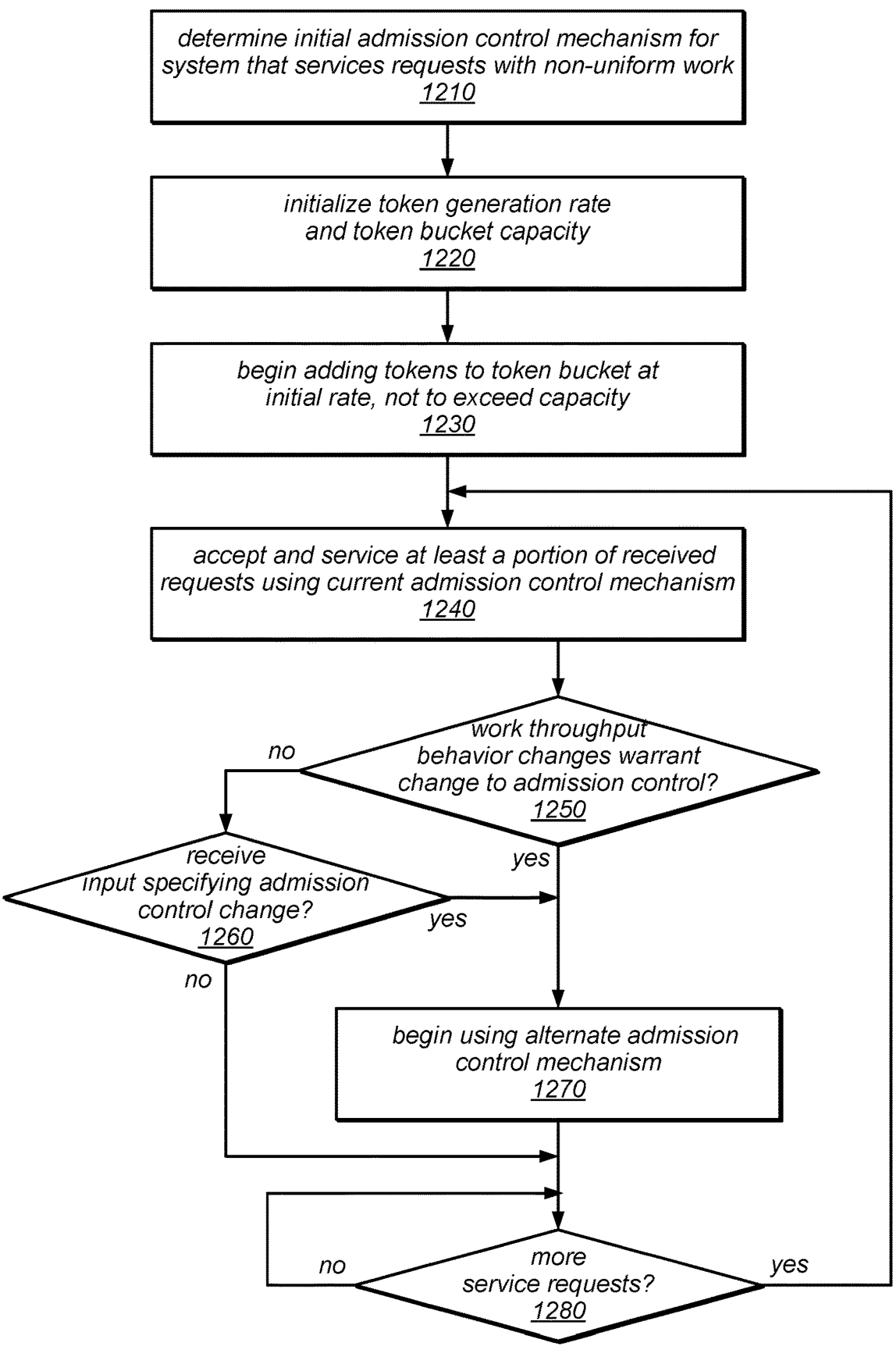
FIG. 12 is a flow diagram illustrating one embodiment of a method for dynamic selection of an admission control mechanism in a system that services requests having non-uniform workloads.

In some embodiments, a system that provides services to clients may support two or more admission control mechanisms, including one that throttles requests using a token bucket containing tokens that represent service requests and one that throttles requests using a token bucket containing tokens that represent work performed in servicing requests, as described herein. The system may accept service requests for servicing based on a selected one of the supported admission control mechanisms and may dynamically select and/or change the admission control mechanism used to accept requests for servicing based on current or changing conditions in the system and/or the workload observed by the system. FIG. 12 is a flow diagram illustrating one embodiment of a method for dynamic selection of an admission control mechanism in a system that services requests having non-uniform workloads. As illustrated in FIG. 12, the method may include determining an initial admission control mechanism for a system that services requests that require a non-uniform amount of work, as in 1210. In various embodiments, the initial admission control mechanism may be determined based on a system-wide or client-specific default selection or policy, a service level agreement, a target or committed work throughput rate, a historical workload observed by the system (e.g., the rate or frequency of requests, the amount of work required to satisfy those requests, and/or the distribution or variability of the requests or the amount of work required to satisfy the requests), user input, or other factors.

As illustrated in this example, the method may include initializing the token generation rate and the token bucket capacity to be used by the selected admission control mechanism, as in 1220. Each of the tokens may represent an accepted service request or a fixed amount of work (e.g., a unit of work), depending on the admission control mechanism that has been selected. The method may include beginning to add tokens to the token bucket at the initial token generation rate, while not exceeding the initial token bucket capacity, as in 1230, and accepting and servicing at least a portion of the received service requests using the current admission control mechanism, as in 1240. For example, in some embodiments requests may be accepted for servicing if at least one token is present in the token bucket when the requests are received. In other embodiments, the minimum number of tokens that must be present in the token bucket in order for a received service request to be accepted for servicing may be a pre-determined value greater than one, may be configurable at initialization of the system/service, and/or may be dynamically configurable during operation of the system/service (e.g., based on the observed workload and/or other factors). If an admission control mechanism that uses work-based tokens has been selected, servicing a request may include deducting an initial (e.g., a default or standard) number of tokens from the bucket, determining whether the amount of work performed in servicing the request was greater than the amount of work represented by the initially deducted tokens, and (if so) deducting one or more additional work-based tokens to reflect the additional work. Servicing a request under such an admission control mechanism may also include dynamically adjusting the token generation rate and/or maximum bucket capacity in response to various triggers, as described herein. If an admission control mechanism based on tokens that represent serviced requests has been selected, servicing the request may include deducting a single service request token from the token bucket and servicing the request. Servicing a request under such an admission control mechanism may also include dynamically adjusting the maximum request rate (and, thus, the rate at which tokens are added to the token bucket) based on an observed workload and/or other performance data, as described herein.

As illustrated in this example, if the work throughput behavior changes, and those changes warrant a change in the admission control mechanism used to manage service requests, shown as the positive exit from 1250, the method may include selecting and beginning to apply an alternate admission control mechanism to manage service requests, as in 1270. For example, a different admission control mechanism may be more appropriate for managing service requests if there is a change in the rate or frequency at which requests are received; the minimum, maximum, or average amount of work required to satisfy those requests over a given sample period; and/or the distribution or variability in the rate at which requests are received or in the amount of work required to satisfy the requests. In various embodiments, a system-wide or client-specific policy may specify that such changes in the workload and/or changes in the availability of resources to support the observed workload may trigger a change in the admission control mechanism used to manage requests. For example, if the target work throughput rate is observed to be relatively low, or the average amount of work required to satisfy requests is observed to be highly variable, an admission control mechanism that uses work-based tokens may be more appropriate. On the other hand, if the target work throughput rate is observed to be relatively high, an admission control mechanism that uses tokens representing serviced requests may be more appropriate.

As illustrated in this example, if input is received specifying that the admission control mechanism should be changed, shown as the positive exit from 1260, the method may include beginning to apply an alternate admission control mechanism to manage service requests, as in 1270. For example, a change in a service level agreement or other user (e.g., client) input may be received specifying that a different admission control mechanism should be used, and the method may including making the requested change to the admission control mechanism in response to this input. While there is no change in the work throughput behavior warranting a change to the admission control mechanism used to manage service requests, and no input specifying that the admission control mechanism should be changed (shown as the negative exits from 1250 and 1260), the admission control mechanism may not be changed.

In the example illustrated in FIG. 12, as long as service requests are being received, the system may continue to receive and service at least a portion of the service requests it receives dependent on the currently selected admission control mechanism. This is illustrated in FIG. 12 by the feedback from the negative exit from 1280 back to 1280 (illustrating that the system may wait to receive additional service requests) and the feedback from the positive exit from 1280 to 1240 (illustrating that the operations illustrated in 1250-1270 may be repeated if and when additional service requests are received). In other words, if any additional service requests are received, they may be accepted and serviced (if there are at least a pre-determined minimum number of I/O-based service request tokens in the token bucket), or may be rejected (if not).

Many of the examples described herein are directed to Web-based services and/or data storage services (and more specifically to data storage services in which data is maintained in one or more tables on behalf of clients). However, in other embodiments, the techniques described herein for dynamically adjusting a maximum rate at which service requests are accepted and/or serviced based on the current workload (e.g., the average number of work units performed per second in satisfying recent service requests) may be applied in any system in which the amount of work needed to satisfy various service requests is not uniform or fixed, and/or in which the work performed when servicing requests may be a limiting factor in the operation and/or performance of the system (e.g., due to technical capabilities, capacity, or bandwidth, or due to business and/or policy considerations, including various service level agreements). In these other embodiments, work throughput rates may be specified, calculated, and/or expressed in terms of any suitable measurement of the resources required to satisfy the requests (e.g., in terms of any physical or logical unit of work that represents the consumption of a shared and/or limited resource in the system).

It is contemplated that in some embodiments, any of the methods, techniques or components described herein may be implemented as instructions and data capable of being stored or conveyed via a computer-accessible medium. Such methods or techniques may include, for example and without limitation, various methods for throttling and otherwise managing service requests that have non-uniform workloads, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 13:
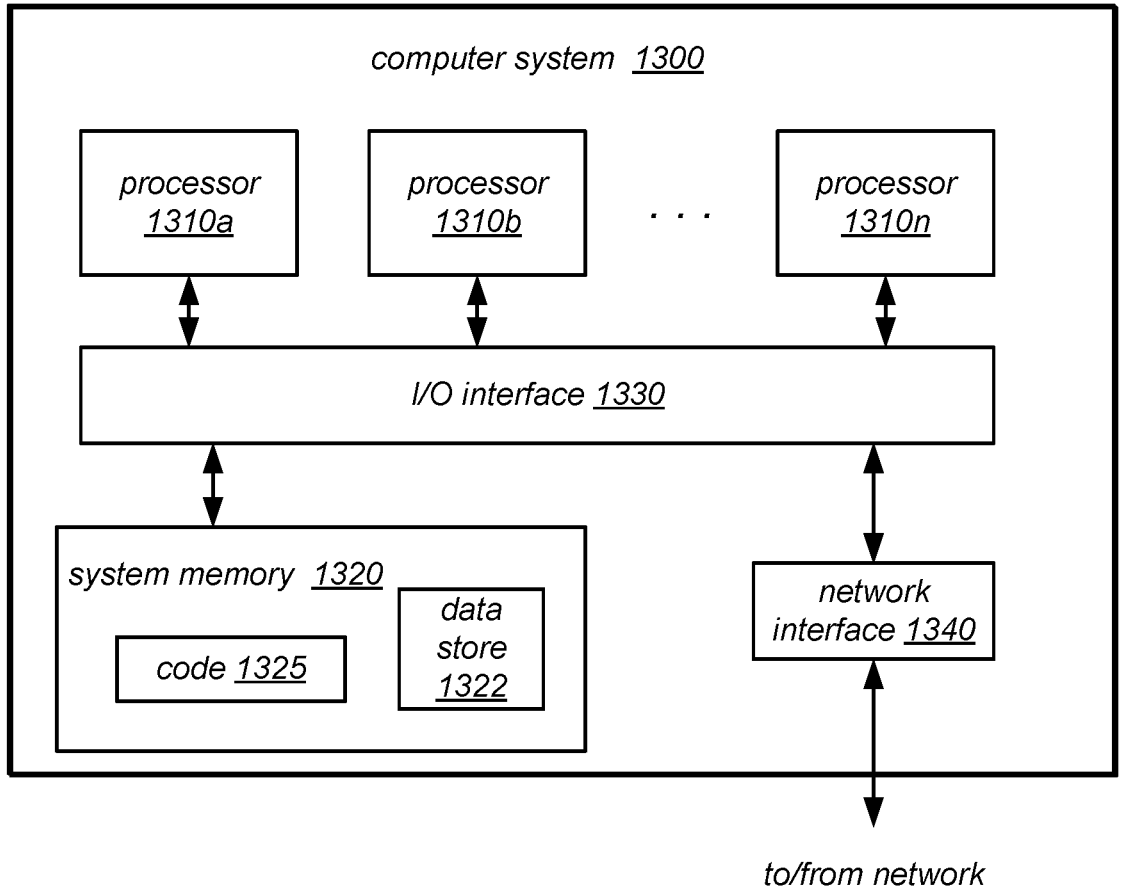
FIG. 13 illustrates one embodiment of a computer system that implements one or more of the techniques described herein for managing service requests with non-uniform workloads.

One embodiment of a computer system that implements one or more of the techniques described herein for throttling and otherwise managing service requests that have non-uniform workloads (e.g., adjusting a maximum request rate dependent on a current work throughput rate, generating and deducting request-based or work-based service tokens, selecting between admission control mechanisms, etc.) is illustrated in FIG. 13. In different embodiments, the functionality of any of the various modules or methods described herein may be implemented by one or several instances of computer system 1300. In particular, it is noted that different elements of the system described herein may be implemented by different computer systems 1300. For example, a computer system that supports the functionality described herein for throttling and otherwise managing service requests that have non-uniform workloads may be implemented on the same computer system 1300 on which a client (through which a customer or subscriber may access the system) executes, or on another computer system 1300, in different embodiments. In another example, different subsystems (e.g., a Web service interface, an admission control subsystem, and a service request subsystem; and/or one or more Web servers or other components) may be implemented on or across multiple ones of the computing nodes, and each of the computing nodes may be similar to computer system 1300.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1310 may commonly, but not necessarily, implement the same ISA.

System memory 1320 may be configured to store instructions (e.g., code 1325) and data (e.g., in data store 1322) accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting throttling and otherwise managing service requests that have non-uniform workloads using any or all of the mechanisms described herein), are shown stored within system memory 1320 as code 1325. It is noted that in some embodiments, code 1325 may include instructions and data implementing desired functions that are not directly executable by processor 1310 but are represented or encoded in an abstract form that is translatable to instructions that are directly executable by processor 1310. For example, code 1325 may include instructions specified in an ISA that may be emulated by processor 1310, or by other code 1325 executable on processor 1310. Alternatively, code 1325 may include instructions, procedures or statements implemented in an abstract programming language that may be compiled or interpreted in the course of execution. As non-limiting examples, code 1325 may include code specified in a procedural or object-oriented programming language such as C or C++, a scripting language such as perl, a markup language such as HTML or XML, or any other suitable language.

In some embodiments, data store 1322 within system memory 1320 may store values of default, system-side, client-specific, or type-specific configurable parameters used in throttling and otherwise managing service requests that have non-uniform workloads; observed, sampled, measured, and/or aggregated (e.g., averaged) performance information (including, but not limited to: actual work throughput rates, maximum request rates, actual request rates and/or rejection rates, and/or target or committed work throughput rates); configuration data (e.g., token bucket capacity limits, default token generation rates, default token deduction values, service level agreement parameter values, admission control policy data, and/or client-specific parameter values) data representing service request tokens that are contained in a token bucket; and/or other data in various data structures suitable for implementing the techniques described herein.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, for example. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1320 may include a non-transitory, computer-readable storage medium configured to store instructions and data as described above. However, in other embodiments, instructions and/or data may be received, sent or stored upon different types of computer-accessible storage media. Generally speaking, a non-transitory, computer-readable storage medium may include storage media or memory media such as magnetic or optical media, e.g., disk or CD/DVD-ROM coupled to computer system 1300 via I/O interface 1330. A non-transitory, computer-readable storage medium may also include any volatile or non-volatile storage media such as RAM (e.g. SDRAM, DDR SDRAM, RDRAM, SRAM, etc.), ROM, etc, that may be included in some embodiments of computer system 1300 as system memory 1320 or another type of memory. A computer-accessible storage medium may generally be accessible via transmission media or signals such as electrical, electromagnetic, or digital signals, conveyed via a communication medium such as a network and/or a wireless link, such as may be implemented via network interface 1340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   performing by a Web service:
   monitoring performance of a plurality of service requests of a particular one or more clients received at the Web service according to a requested target rate of units of work to service requests associated with the particular one or more clients at the Web service and within a maximum allowable request rate for the particular one or more clients;
   wherein the monitoring comprises:

measuring respective numbers of units of work performed to service a portion of the plurality of service requests at the Web service; and comparing, at the Web service, an observed rate of the respective numbers of units of work performed to service the portion of the plurality of service requests with respect to the requested target rate of the units of work; and based, at least in part, on the comparison and a configurable value that determines respective amounts of one or more incremental adjustments of the maximum allowable request rate for the particular one or more clients in one or more adjustment cycles, allocating one or more resources to service additional service requests received at the network-based service according to a plurality of incremental adjustments to the maximum allowable request rate used to manage performance of the additional service requests received at the Web service subsequent to the plurality of incremental adjustments to the maximum allowable request rate.

2. The method of claim 1,
wherein the observed rate exceeds the requested target rate; and
wherein the plurality of incremental adjustments comprises:
   determining the amount by which to lower the maximum allowable request rate; and
   lowering the maximum allowable request rate by the determined amount.

3. The method of claim 2,
wherein the maximum allowable request rate represents the maximum number of requests that can be accepted for servicing per second.

4. The method of claim 1, wherein the observed rate is an average of rates measured in two or more sample periods.

5. The method of claim 1,
wherein the plurality of incremental adjustments comprises:
   determining an amount by which to raise the maximum allowable request rate; and
   raising the maximum allowable request rate by the determined amount.

6. A system, comprising:
one or more processors; and
a memory coupled to the one or more processors and storing program instructions that when executed by the one or more processors cause the one or more processors to implement a Web service, configured to:
   monitor performance of a plurality of service requests of a particular one or more clients received at the Web service according to a requested target rate of units of work to service requests at the Web service associated with the particular one or more clients and within a maximum request rate for the particular one or more clients;
   wherein to monitor performance, the Web service is configured to:
   measure respective numbers of units of work performed to service a portion of the plurality of service requests at the Web service;
   compare, at the Web service, an observed rate of the respective numbers of units of work performed to service the portion of the plurality of service requests with respect to the requested target rate of units of work; and

based, at least in part, on the comparison and a configurable value that determines respective amounts of a plurality of incremental adjustments of the maximum allowable request rate for the particular one or more clients in a plurality of adjustment cycles, allocate one or more resources to service additional service requests received at the network-based service according to a plurality of incremental adjustments to the maximum allowable request rate used to manage performance of the additional service requests received at the Web service subsequent to the plurality of incremental adjustments to the maximum allowable request rate.

7. The system of claim 6,
wherein the observed rate at which work was performed exceeds the requested target rate for performing work when servicing requests; and
wherein the plurality of incremental adjustments:
determine an amount by which to lower the maximum allowable request rate; and
lower the maximum allowable request rate by the determined amount.

8. The system of claim 7,
wherein the maximum allowable request rate represents the maximum number of requests that can be accepted for servicing per second; and
wherein the requested target rate of units of work is specified in terms of a number of units of work performed per second.

9. The system of claim 7, wherein the requested target rate of units of work comprises a committed rate for performing work that is specified by the client-specific policy.

10. The system of claim 6, wherein the observed rate of the respective numbers of units of work represents an average of the rates at which work was performed in two or more sample periods.

11. The system of claim 10, wherein the the average represents a moving average over a particular number of sample periods.

12. The system of claim 6,
wherein the observed rate at which work was performed is less than the requested target rate for performing work when servicing one or more requests; and
wherein the plurality of incremental adjustments:
determine an amount by which to raise the maximum allowable request rate; and
raise the maximum allowable request rate by the determined amount.

13. The system of claim 6, wherein the plurality of incremental adjustments are performed according to an adjustment cycle.

14. One or more non-transitory, computer-readable storage media, storing program instructions that when executed on or across one or more computing devices, cause the one or more computing devices to implement a Web service that implements:
monitoring performance of a plurality of service requests associated with a particular one or more clients received at the Web service according to a requested target rate of units of work to service requests associated the particular one or more clients at the Web service and within a maximum request rate for the particular one or more clients;
wherein, in monitoring, the program instructions cause the one or more computing devices to implement:

measuring respective numbers of units of work performed to service a portion of the plurality of service requests at the Web service;
comparing, at the Web service, an observed rate of the respective numbers of units of work performed to service the portion of the plurality of service requests with respect to the requested target rate of units of work; and
based, at least in part, on the comparison and a configurable value that determines respective amounts of a plurality of incremental adjustments of the maximum allowable request rate for the particular one or more clients in a plurality of adjustment cycles, allocating one or more resources to service additional service requests received at the network-based service according to a plurality of incremental adjustments to the maximum allowable request rate used to manage performance of the additional service requests received at the Web service subsequent to the plurality of incremental adjustments to the maximum allowable request rate.

15. The one or more non-transitory, computer-readable storage media of claim 14,
wherein the observed rate at which work was performed exceeds the requested target rate for performing work when servicing requests; and
wherein the plurality of incremental adjustments, comprises:
determining an amount by which to lower the maximum allowable request rate; and
lowering the maximum allowable request rate by the determined amount.

16. The one or more non-transitory, computer-readable storage media of claim 15,
wherein the maximum allowable request rate represents the maximum number of requests that can be accepted for servicing per second; and
wherein the requested target rate of units of work is specified in terms of a number of units of work performed per second.

17. The one or more non-transitory, computer-readable storage media of claim 15, wherein the requested target rate of units of work comprises a committed rate for performing work that is specified by a client-specific policy.

18. The one or more non-transitory, computer-readable storage media of claim 14, wherein the observed rate of the respective numbers of units of work performed represents an average of the rates at which work was performed in two or more sample periods.

19. The one or more non-transitory, computer-readable storage media of claim 18, wherein the average represents a moving average over a particular number of sample periods.

20. The one or more non-transitory, computer-readable storage media of claim 14,
wherein the observed rate at which work was performed is less than the requested target rate for performing work when servicing one or more requests; and
wherein the plurality of incremental adjustments, comprises:
determining an amount by which to raise the maximum allowable request rate; and
raising the maximum allowable request rate by the determined amount.

* * * * *